United States Patent [19]

Choate

[11] Patent Number: 5,123,112
[45] Date of Patent: Jun. 16, 1992

[54] AIR-TO-GROUND COMMUNICATION SYSTEM

[75] Inventor: Bernard K. Choate, Chicago, Ill.

[73] Assignee: GTE Airfone Incorporated, Oak Brook, Ill.

[21] Appl. No.: 562,114

[22] Filed: Aug. 2, 1990

[51] Int. Cl.⁵ .................. H04Q 7/00; H04J 3/00
[52] U.S. Cl. ........................ 455/56.1; 370/95.3;
    455/62; 455/33.2; 455/34.1; 455/67.4
[58] Field of Search ................ 455/33, 32, 34, 44,
    455/49, 51, 54, 56, 62, 67, 38, 71; 379/58-60,
    63; 370/95.1, 95.3

[56] References Cited

U.S. PATENT DOCUMENTS

| | | |
|---|---|---|
| 3,952,251 | 4/1976 | Kahn . |
| 4,144,412 | 3/1979 | Ito et al. ............................ 179/2 EB |
| 4,419,766 | 12/1983 | Goeken et al. . |
| 4,797,947 | 1/1989 | Labedz ............................ 455/33 |
| 4,850,032 | 7/1989 | Freeburg ............................ 455/51 |
| 4,870,408 | 9/1989 | Zdunek et al. ............... 340/825.030 |
| 4,926,421 | 5/1990 | Kawano et al. ..................... 370/95.1 |

Primary Examiner—Reinhard J. Eisenzopf
Assistant Examiner—Chi H. Pham
Attorney, Agent, or Firm—Lowell W. Gresham

[57] ABSTRACT

An air-to-ground communications system is described for controlling multiple two way radiotelephone conversations between a large number of aircraft (53) and a network of base stations (51) that are capable of being interconnected to landline telephone networks (54, 116). Plural base station controllers (90) of the system, each dedicated to control one base station (51), are in turn controlled by a single central processor (52). Means are provided for matching each aircraft with an optimal base station to afford it the strongest available communication signals, and for dynamically allocating communication channels between the base stations. The central processor (52) is designed to manage the system by recording and recognizing usage patterns (525-530) and allocating channels to most efficiently use the available radio spectrum among all the aircraft (517, 519).

21 Claims, 21 Drawing Sheets

AIR-TO-GROUND COMMUNICATION SYSTEM

BACKGROUND OF INVENTION

1. Field of Invention

This invention relates to an improved air-to-ground communications system for airline passengers that interfaces with landline telephone networks. More particularly, the invention concerns an air-to-ground system serving many aircraft, where each aircraft is matched with an optimum one of many base stations in a network, and wherein communications channels are dynamically reallocated between base stations on a system managed basis to most efficiently use the available radio spectrum.

2. Description of Related Art

A currently existing system, operated by the Assignee of the present application, uses a network of ground stations to provide telecommunications coverage for a plurality of aircraft. Each ground station conducts communications with passengers on aircraft within its range, on specific FCC allocated radio frequency channels, using one or more pilot channels and up to 31 additional voice channels that accompany each pilot channel. The pilot channels carry information necessary for an aircraft to select an optimal base station as determined by its position and flight direction, and subsequently to utilize unoccupied voice channels associated with that base station. Following base station selection, the voice channels carry encoded conversations between the aircraft, through the selected base station, to called numbers on landline networks.

U.S Pat. No. 4,419,766, entitled "Method and Means for Providing Improved Air/Ground Radio Telephone Communications" relates to such a system. Likewise, U. S. Pat. No. 3,952,251, entitled "Narrow Bandwidth, Compatible Single SideBand (CCSB) Transmission System, and Three Tone Generator Used Therein" describes a transmission technique having utility in such a system.

However, additional needs inevitably accompany installation and use of such a system. At present, base stations established to cover geographic regions experiencing light air traffic require assignment of all 31 available voice channels, by definition, despite a possible lack of need of these channels, and despite an unsatisfied need for channels in adjacent high traffic areas.

The current system also could be improved where an aircraft selects an optimal pilot channel but finds that all 31 designated voice channels for that pilot channel are busy. Currently, the aircraft might then select and establish contact with a less desirable base station, thereby providing less desirable voice quality calls and less predictable call duration.

Also, technical limitations currently restrict coverage in each geographical zone to a maximum of three pilot channels. Because of this, the maximum load of each base station is 93 voice channels, or in other words, only 93 conversations at any time. Increasing air-to-ground communications traffic could easily outpace this channel availability.

In addition, an improved system is needed to better facilitate calls made from aircraft while on the ground at airports. The present system handles a substantial number of passenger calls made from aircraft at airports while the aircraft are delayed, stopping between flights, departing late, or arriving late. As a result, the present system inefficiently allocates a limited number of voice channels to each geographic region despite the fact that many calls are placed, conducted, and ended within the confines of an airport. Because of the resulting hardship placed on airborne callers that receive busy signals due to a high concentration of system calls conducted at airports, an improved system to solve this problem is necessary.

The relative altitude of aircraft affects potential interference between calls. A single frequency channel may be simultaneously used at different locations so long as the locations are sufficiently spaced apart to prevent interference. However, as the altitude of an aircraft increases, the amount of surface area of the earth over which its on-board transceivers can communicate increases. Thus, higher flying aircraft experience a greater potential for interference between frequency channels simultaneously being used at diverse surface locations. The design of the current frequency spectrum allocation methodology assumes that all aircraft are at a predetermined "maximum" altitude to prevent channel interference. This forces an inefficient use of channels for aircraft flying at lower altitudes. In addition, aircraft occasionally exceed the predetermined "maximum" altitude. When this happens, channel interference results. An improved system is needed for better spectrum efficiency. Moreover, as aircraft technology advances to permit increased aircraft altitudes, improvements are needed to prevent such increased altitudes from causing increased interference.

Likewise an improved system is needed to accommodate the "moving peak" phenomenon. Call demand generated by airplanes geographically shifts as flights progress. One factor to which this condition is attributable is the regular departure, on competing routes, of waves comprising different airline flights between city pairs. At the beginning of each wave there is moderate demand placed upon the base stations that cover each of the cities in the city pair. But, as the aircraft depart at regular time intervals from one city to another, the peak call demand moves toward a point between the cities. At the midpoint base station, the call demand is effectively doubled as the aircraft pass each other.

In addition, airline service in, for example, the United States generally involves a primary east to west wave of aircraft each morning and a subsequent west to east return wave each afternoon. North-south flights throughout the day cross this pattern and generate complementary load factors on the air-to-ground communications system. The effect of this entire traffic pattern can be analogized to a series of multi-directional waves moving across a body of water. At certain points, the waves intersect, join, and become critically larger. Because of such a "moving peak" effect, improvement in the current system will be needed to manage peak call demand as flight traffic and call traffic increases.

Finally, an improved system is needed to solve recurring irregularities in air-to-ground call traffic. Generally call volume in both air-to-ground and landline telephone use is highly predictable. Usually, air-to-ground call volume for a particular geographic region can be reliably predicted by using data such as the time of the year, time of day, and flight patterns near that region. However, unique circumstances such as flight delays, adverse weather conditions, and other factors can cause air-to-ground call volume to shift unexpectedly in affected regions. Because of such occurrences, means are needed to record the effects of these problem factors, provide solutions to be used if the same problem factors arise again, and apply the solutions as needed in the future.

SUMMARY OF THE INVENTION

Accordingly, it is an object of the present invention to provide an improved air-to-ground communication system which is managed in an optimum fashion from a system standpoint.

It is another object of the invention to provide dynamic reallocation of communication channels throughout such an air-to-ground system.

It is yet a further object of the invention to provide improved means for an aircraft to select base station service of an optimum nature.

It is another object of the invention to provide means in such a system for recording of communications traffic pattern information and utilizing of such information in predictive fashion.

It is still a further object of the invention to provide an air-to-ground communication system that provides dedicated service to airport located aircraft and accommodates aircraft at different altitudes.

It is another object of the invention to provide for the use of spectrum, in the same geographic area, by other providers and services.

These objects and other features and advantages are attained in a system that provides means for conducting radiotelephone communications between many airline passengers and telephones served by landline telephone networks in a managed system.

A plurality of base stations are provided to simultaneously transmit and receive conversations between one or more aircraft and a base station network. Such communication is conducted over a single pilot signal for each base station and a plurality of voice channels for each base station. The pilot signal is broadcast for the benefit of all aircraft within range of a given base station. The pilot signal serves to help each aircraft in selecting a base station for optimal, long term reception, inform aircraft of the availability and frequency of currently available voice channels (which carry encoded conversations), and assist aircraft in selecting and occupying one or more voice channels for use of on-board telephones.

Incoming signals to a base station, from the aircraft, are detected by receiving antennas, reduced to component channels by a receive splitter, and distributed to the plurality of base station transceivers. Similarly, outgoing signals from the plurality of base station transceivers undergo aggregation in a transmit combiner, before being broadcast by a transmitting antenna.

The controller for each base station includes a computer that controls the interface between the landline telephone network and the plurality of transceivers, performs housekeeping tasks such as transmitting status reports to a central processor, and locally executes commands issued by the central processor. Additionally, when regional aircraft occupy previously vacant voice channels, the base station controller responds by adjusting the pilot signal to reflect the newly occupied voice channels.

In default, the central processor distributes assignment of all voice channels among the plurality of base stations, based upon the base stations' historical activity records. During periods of low activity, the central processor re-distributes voice channels based on the next expected activity peak. There is no unassigned spectrum.

Activity records also provide the basis for the central processor to arrange and manage data in a static allocation mode, upon which base stations run if the communication of one or more base stations with the central processor is interrupted. In such a condition, the affected base station communicates with aircraft only upon certain predetermined voice channels until communications with the central processor are restored and the central processor orders the base station to return to its normal, dynamic allocation mode.

Under normal operating conditions, a key function of each base station is the ability to request from the central processor assignment of groups of additional voice channels when aircraft in the geographical region of that base station create a demand for additional service. Thus, as air traffic in the geographical region of a base station increases, that base station may request reallocation of additional voice channels, limited only by the current demands of other base stations, the total frequency spectrum allotted to the system as a whole, and prescribed portions of the spectrum in use by other service providers.

The central processor responds to such a base station request for increased channels by checking the call activity of adjacent base stations, and adjusting their allocation if possible, so that additional voice channels can be assigned to the requesting base station. In addition, the central processor evaluates the activity trends of all base stations based upon actual data so that base stations showing an increasing demand for voice channels will not be deprived of channels when other stations are showing a decreasing demand.

Additionally, the central processor follows a predetermined pattern of frequency reuse in guiding channel allocation so that adjacent base stations do not interfere with one another, or other spectrum users in the coverage area of each base station.

Aboard each aircraft, an aircraft control unit is coupled with a pilot receiver and a plurality of aircraft transceivers to sample all pilot signals offered within the reception area of the aircraft. The aircraft control unit compares the relative strength and Doppler frequency shift error of each of the pilot signals and selects the base station that will supply the strongest, most enduring service.

DETAILED DESCRIPTION OF THE INVENTION

Figure 1:
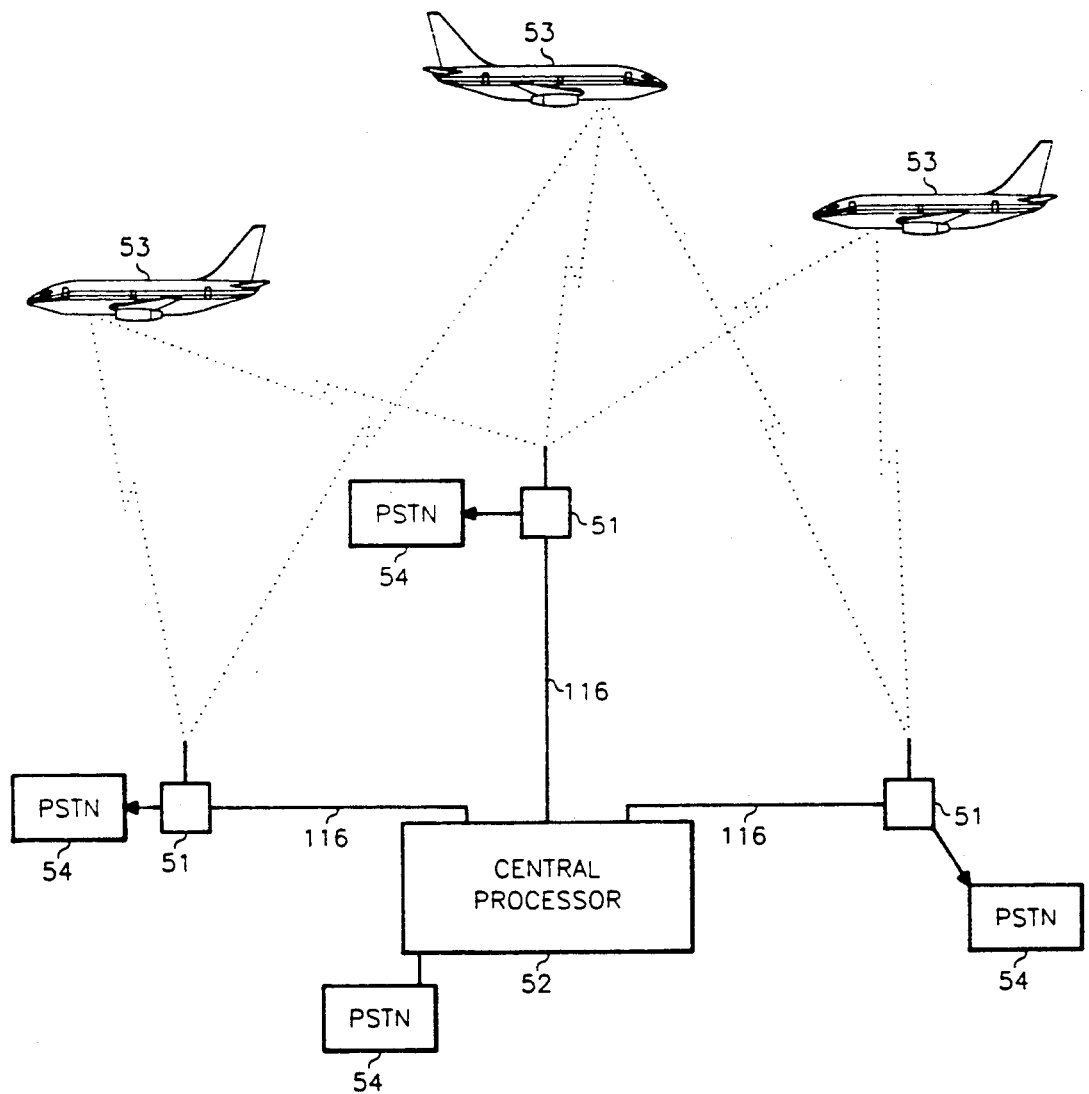
FIG. 1 is a drawing showing components of the present invention.

Referring now to the drawings, and particularly to FIG. 1, a preferred embodiment of the invention is described. The invention is related to an improved air-to-ground communications system that operates to interconnect telephones contained aboard many geographically spaced operational aircraft 53 with a public switched telephone network 54. The system also includes one or more geographically regionalized base stations 51, and a central processor 52.

Central processor 52 primarily oversees operation of all base stations and conducts dynamic voice channel allocation, operational analysis, and customer billing. The central processor communicates with the base stations via a multi-drop private line network 116.

In order to manage the system and adequately serve the air traffic in all base station regions, on a daily cycle, central processor 52 uses each base station's available historical activity records to calculate a nominal number of voice channels required for default use of each base station. Upon initiation of base station activity due to startup, system boot-up, or reset, central processor 52 first assigns voice channels to all the base stations 51 in the system according to this predetermined, historically based, distribution pattern.

However, during subsequent routine operation of the system, central processor 52 allocates voice channel assignments among the base stations based upon expected volume and time of call activity in given base station regions, based upon its short term utilization forecasting.

All base stations report current activity status to the central processor 52 when it requests such a report, or when the base station requests assignment of additional voice channels. Base stations are assigned additional voice channels when system analysis indicates that increasing user traffic will soon use all the current allotment of channels assigned by the central processor. Also, any base station request for central processor assignment of additional voice channels is limited only by the extent that available channels are occupied by surrounding base stations, or other spectrum users, as well as the size of the entire frequency spectrum initially allotted for air-to-ground service.

The system is also configured to generate an alarm and emergency status signal when communication over multi-drop private line network 116 between the central processor and one or more base stations is interrupted. However, the emergency status condition affects only the base stations that experience a communications loss with the central processor. Such stations are placed in a static mode, while the affected base stations attempt to re-establish alternate means of communication with the central processor, for example through the public switched telephone network via direct/long distance telephone connections.

In an interim period, each affected base station automatically operates within its current historically based allocation. During static mode the base stations may activate only the voice channels previously assigned to them. When the emergency condition dissipates and the central processor re-establishes communication with the affected base stations, it removes affected base stations from the static mode. Subsequently, normal dynamic reallocation of voice channels is resumed in these base stations.

It should now be apparent that each base station 51 selectively transmits and receives radio frequency signals to and from air-to-ground system equipped aircraft 53, simultaneously relaying communications between the plurality of aircraft 53 and the public switched telephone network (PSTN) 54. In the case of a single base station 51, this communication is conducted via one pilot signal and a plurality of radio frequency voice channels. Each base station 51 broadcasts a single pilot signal for the benefit of all aircraft 53 within communication range of that base station 51. This pilot signal informs aircraft 53 of voice channel availability and frequency, and helps aircraft 53 to select a base station for optimal, long term reception. Each base station also uses select voice channels to transmit and receive radio frequency encoded conversations of passengers on aircraft it is engaged with.

An aircraft communication system having several functions is installed aboard each aircraft. This system provides an interface to the user/customer in the form of one or more telephones distributed throughout the cabin. The aircraft system also includes controls for continually scanning through all the potential pilot signals in the system to determine the station of optimal reception based upon comparisons of signal strength and Doppler frequency shift error. Previously discussed U.S. Pat. No. 4,419,766 discloses techniques which may be adopted to make such comparisons. When a user requests placement of a call on the system, the aircraft system selects an available voice channel emanating from a base station that the aircraft control unit most recently found to provide the best reception.

Figure 2:
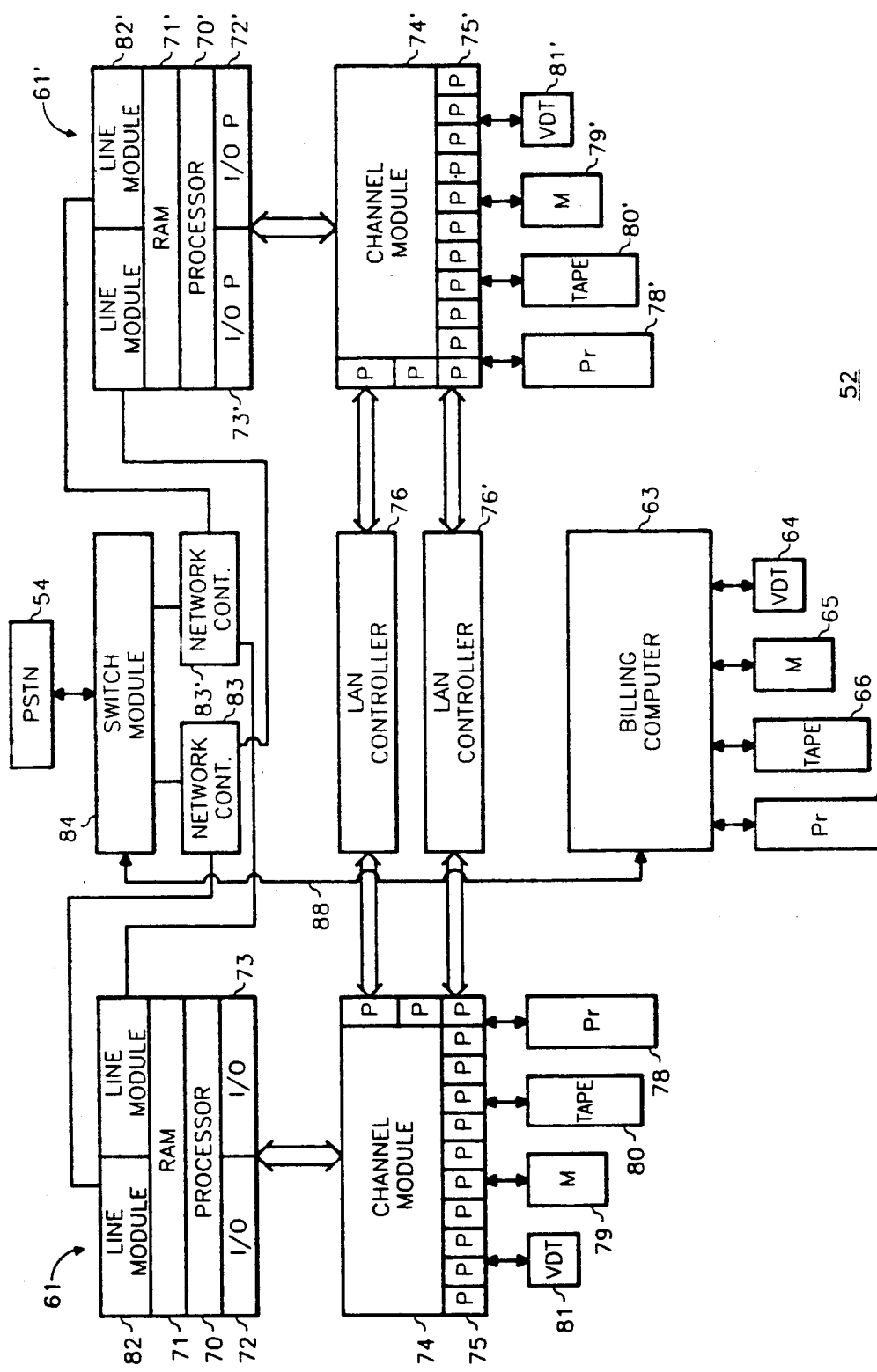
FIG. 2 is a block diagram of the central processor of the present invention.

Referring now to FIG. 2, the central processor 52 includes two central computers 61, 61' and a billing computer 63. The central computers 61, 61' are identical and are configured to operate in redundant fashion, so that one can substitute for the other in the event of failure. The billing computer 63 can comprise almost any general purpose computer capable of running COBOL routines, and need not be located with the central computers. However in the preferred embodiment it is of the same design as computers 61, 61'

The billing computer 63 effects charges to credit card accounts of aircraft telephone users, based upon calling activity records that the central processor generates. A video display terminal (VDT) 64 for CPU operator interface, a memory (M) 65 for billing related program and data storage, a tape drive (tape) 66 for accessing a billing tape, and a line printer (Pr) 67 all are peripherally connected to the billing computer 63.

All the components of one central computer, identical to corresponding components of the other central computer and designated by like primed numerals, promptly assume control if the computer in use malfunctions. Thus, the primary computer 61, conducts operations of the central processor 52, and the secondary computer 61' constantly monitors the performance of the primary computer, waiting to replace the primary computer in the event of its failure.

In the preferred embodiment, the central processor component of each of the redundant central computers is a Unisys model 2200/401 computer, based on a 2200/400 1×1 processor 70, 70' (Model 22411-EXP). Other general purpose computers could also be used. Each computer in the preferred embodiment has 16 MB of RAM 71, 71', and two I/O processors 72, 72' and 73, 73'. Each I/O processor is coupled to a Model 22400-BMM BMC channel module 74, 74' which has a number of interface ports (P) 75, 75'.

There are two model LAN1-HLC host LAN controllers 76, 76', each of which attaches to a BMC channel module port 75, 75' of each redundant computer. It is through these host LAN controllers that the two redundant computers each can monitor the status of the other. Also connected to ports 75 and 75' are two video display terminals (VDT) 81, 81', two print subsystems (Pr) 78, 78', two disk subsystems (M) 79, 79' and two tape subsystems 80, 80'.

Each central computer further has two Model 22400-LMD FEPI line modules 82, 82' that connect to a pair of Model F3882-03 DCP/15 telephone network controllers 83, 83', which control communications with the PSTN 54. A Model 2523-00 line switch module 84 switches control of the system from one redundant central computer to the other in the event of failure, and is attached to both network controllers.

The central computers connect to and interact with the billing computer through an interprocessor bus 88. Accordingly, the central computer can transfer call record files to the billing computer for processing therein. Alternatively, physical tape transfer can accomplish the same task.

Operators may directly access the central computers through Unisys VT1220 video display terminals 81, 81'. These terminals enable an operator to communicate with and take selective control of any base station via the central computers.

Figure 3:
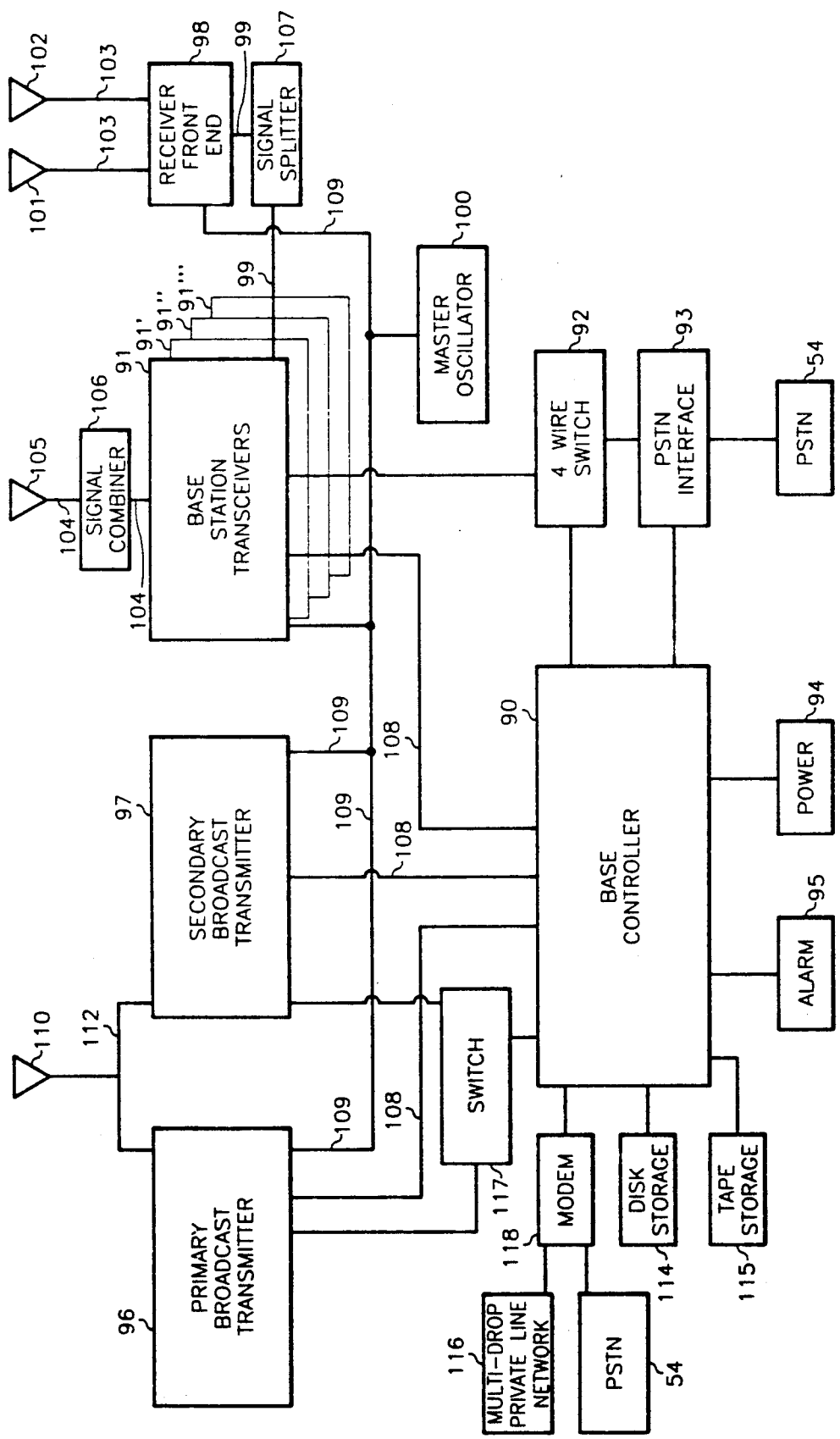
FIG. 3 is a block diagram of a base station of the present invention.

Referring now to FIG. 3, the specific features of a base station are explained. Each base station 51 includes a base controller 90 that locally executes commands of the central processor 52 (see FIG. 1). Also, the base controller performs local housekeeping tasks for its base station and controls an interface 93 between PSTN 54 and a plurality of that base station's channel transceivers 91 that are coupled to the base controller.

The system of the present invention manages a finite frequency spectrum. For example, a 2 MHz frequency spectrum for each of base-to-aircraft and aircraft-to-base communication links may be divided into a predetermined number of frequency channels. Thus, a 2 MHz frequency spectrum may be divided into 320, 6 KHz frequency channels, with a 1.0 KHz guard band between each frequency channel. The present invention contemplates the inclusion of any number of transceivers 91 within base station 51, up to the predetermined number of frequency channels available within the finite frequency spectrum. However, as a practical matter base stations 51 located in areas which tend to experience lower levels of communication traffic may include fewer transceivers than the base stations that reside in higher communication traffic areas. Preferably, no single base station 51 will include a transceiver for each frequency channel in the entire frequency spectrum because of a near certain probability that a large number of such transceivers would never be called into use by central processor 52.

The base station further includes a primary broadcast transmitter 96 and a secondary broadcast transmitter 97 coupled to controller 90 via cables 108. A receiver front end unit 98 is connected via cable 99 to a receiver splitter 107 and transceiver 91. Likewise, a common master oscillator 100 is connected to the receiver front end unit 98 and all the transmitters via cable 109.

Antennas 101 and 102 are connected to receiver front end 98 via cables 103. A channel transmitting antenna 105 is connected to the plurality of base station transceivers 91 through a signal combiner 106, via cables 104. A broadcast transmitting antenna 110 is connected to primary and secondary transmitters 96, 97, respectively, via cable 112.

Each base station further includes an air-to-ground subsystem, generally including a four-wire switch 92, a power system 94, and an alarm system 95 connected to the base controller 90.

The base station transceivers 91 are provided to relay communications over voice channels between the base controller 90 and an aircraft 53. Each base station transceiver 91 is capable of transmitting and receiving any frequency of the allotted radio frequency spectrum. The base station transceivers 91 are controlled by the base controller 90. Each base station transceiver 91 contains a microprocessor based I/O interface (not shown) which is used to communicate with equipment external to the transceiver, such as the base controller. Each base station is designed to accommodate common types of transceivers, and can operate with a mix of different types of transceivers. However, transceivers 91 preferably have common I/O designs, so that control from the base controller can be uniformly administered. This type of technological transparency of transceiver types is also designed into the base station broadcast transmitters 96, 97, as well as the aircraft transceivers, and aircraft pilot receivers, described hereinafter.

Accordingly, base controller 90 sends a command to each of transceivers 91 to specify which frequency channel, if any, to use in conducting communications between base station 51 and aircraft 53. Preferably, to prevent interference, no two transceivers 91 utilize a common frequency channel. In addition, such commands as may be sent from base controller 90 to transceivers 91 utilize a common frequency channel. In addition, such commands may be sent from base controller 90 to transceivers 91 in real-time to dynamically reallocate frequency channels in accordance with real-time instructions received from central processor 52 (see FIG. 2).

In response to the base controller 90, either a primary 96 or secondary 97 broadcast transmitter sends the pilot signal of the base station to any aircraft within range. Broadcast transmitter 96, is designed to modulate via phase shift keying at either 2400 bits/second, using a di-bit phase shift keying, or at higher frequencies by using quad-bit phase shift keying. In addition, broadcast transmitters 96, 97 are controlled to operate in a conventional time multiplexed fashion. Thus, the pilot signal is a pulsed signal which is transmitted within a predetermined time slot. In the preferred embodiment, the pilot signal is broadcast only within one of eight potential time slots, and the selected time slot repetitively occurs after the expiration of the remaining seven time slots.

Both broadcast transmitters are arranged to operate in a "hot-standby" configuration, so that the base controller or alarm system 95 can promptly cause a switch 117 to substitute the secondary broadcast transmitter for the primary broadcast transmitter in case the latter fails. Such a failure condition might arise, for example, when the power level of the primary broadcast transmitter falls below a predetermined threshold.

The receiver front end 98 is designed to provide an interface with approximately 8 db gain between the two space diversified receiving antennas 101, 102 and the channel transceivers 91.

The common master oscillator 100 is designed to provide a frequency that is stable to within $10^{-9}$ percent.

The base controller performs the central computing functions for each base station, including regulation of operation of the base station components, directing base station communications with the central processor, and coordinating use of the base station's assigned spectrum with other services.

In the preferred embodiment, the base controller includes a Unisys U6000/31 computer, based upon an Intel 80386 microprocessor designed to operate at 20 MHz, with 12MB, RAM. A 325MB hard disk 114 is provided, capable of transferring data at a 3.3MB rate to the base controller. For conducting maintenance, tape storage means 115 is provided. Other types of general purpose computers and peripherals could be used as well.

A modem 118 is provided to direct communications from base station controller 90 over either multi-drop private line network 116 or PSTN 54 to the central processor.

Figure 4:
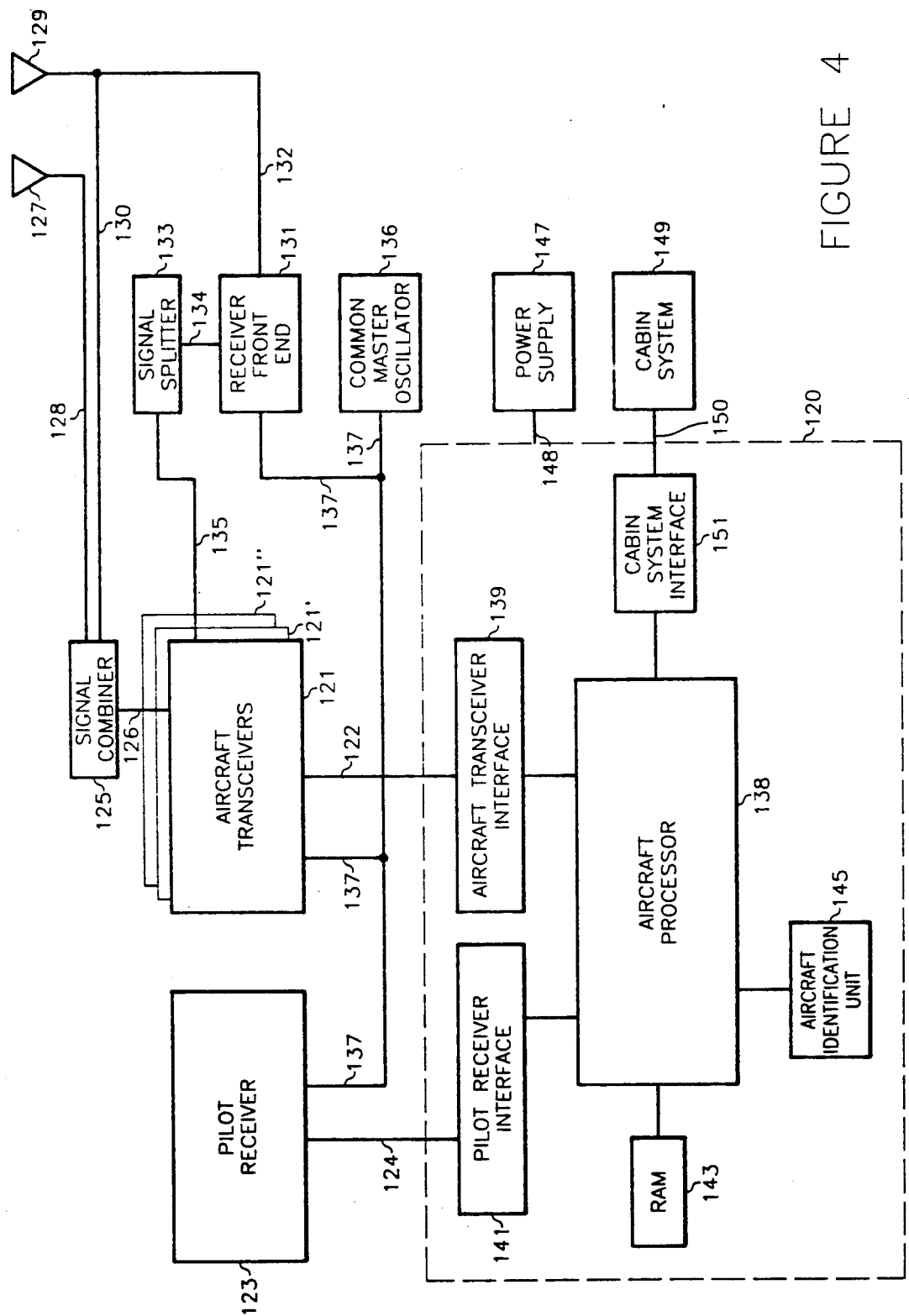
FIG. 4 is a block diagram of the aircraft components of the present invention.

Referring now to FIG. 4, the specific features of an aircraft system are explained. Each aircraft system contains an aircraft control unit 120, which comprises a number of components. The central component of aircraft control unit 120 is an aircraft processor 138. Aircraft processor 138 is connected to a random access memory (RAM) 143, an aircraft identification unit 145, a cabin system interface 151, an aircraft transceiver interface 139, and a pilot receiver interface 141, as illustrated. A power supply 147 is provided, connected to aircraft control unit 120 by a cable 148. A cabin system 149 is connected to cabin system interface 151 by a cable 150.

A plurality of aircraft transceivers 121, 121', 121", etc. are connected to aircraft transceiver interface 139 by a cable 122. In the preferred embodiment, any number of transceivers 121 may be included in an aircraft system, and different aircraft systems may include different numbers of transceivers 121. Each transceiver 121 is dedicated to placing a single call. Thus, the maximum number of calls which may simultaneously take place through any single aircraft system is limited to the number of transceivers 121 included in the aircraft system. However, as a practical matter, the number of transceivers 121 included in an aircraft system will be limited to minimize expense and weight and to generally match the potential availability of frequency channels within the overall communication system of the present invention.

Aircraft transceivers 121 are connected to a signal combiner 125 by a cable 126. Signal combiner 125 is connected, in turn, to a transmitting antenna 127 by a cable 128, and a transmitting and receiving antenna 129 by a cable 130.

Aircraft transceivers 121 are also connected to a signal splitter 133 by a cable 135. A receiver front end 131 is provided, and is attached to signal splitter 133 by a cable 134. Receiver front end 131 is also connected to transmitting and receiving antenna 129 by a cable 132.

Receiver front end 131 and aircraft transceivers 121 are connected by a common bus 137. A common master oscillator 136 is provided, also attached to common bus 137. A pilot receiver 123 is provided. The pilot receiver is likewise connected to common bus 137. Additionally, the pilot receiver is connected to pilot receiver interface 141 by a cable 124.

The interactions of the aircraft system will now be described. Aircraft control unit 120 serves to direct operation of the components of the aircraft system to which it is attached. The central component of aircraft control unit 120 is aircraft processor 138, which exchanges data with aircraft transceivers 121 via aircraft transceiver interface 139. Interface 139 is a bus type interface that permits aircraft processor 138 to access and control plural aircraft transceivers 121 simultaneously in a manner similar to that described above in connection with base transceivers 91 (see FIG. 3). In response to commands from aircraft processor 138, aircraft transceivers 121 transmit and receive signals to and from one or more base stations over one or more voice channels.

Aircraft identification unit 145 provides a unique digital code in response to an inquiry from aircraft processor 138. A digital code is incorporated into each aircraft transmission to the base station in order to uniquely identify the transmitting aircraft. Aircraft processor 138 also relays voice channel communications from aircraft transceivers 121 to cabin system 149, which provides an interface to customers using one or more vending telephones. Both visual and audio interface can be provided. Cabin system 149 may include different types and numbers of aircraft telephones, that need only be compatible with the protocol of cabin system interface 151.

Voice channel data are received by transmitting and receiving antenna 129, and relayed to the receiver front end 131, which is a broad band receiver stage capable of receiving and amplifying signals covering the entire allotted spectrum. Receiver front end 131 provides signal gain and provides an intermediate frequency signal that is sent to all aircraft transceivers 121.

Signal splitter 133 reduces aggregate voice channel signals into individual voice channels. Such aggregate voice channel signals originate from the base stations. Common master oscillator 136 provides a reference signal upon which all other modulated signals of the aircraft system are based.

Voice channel data are transmitted by both transmitting antenna 127 and transmitting and receiving antenna 129. Signal combiner 125 aggregates voice channel data from aircraft transceivers 121 in order to transmit data from a plurality of voice channels, simultaneously.

Pilot receiver interface 141 enables asynchronous communications between aircraft processor 138 and pilot receiver 123. Pilot receiver interface 141 is configured to operate in conjunction with broadcast transmitters 96, 97, discussed previously in connection with FIG. 3. Thus, interface 141, under control of aircraft processor 138, performs time demultiplexing in a conventional manner to separate an aggregate pilot signal, which may include a plurality of time multiplexed pilot signals broadcast from a plurality of base stations 51 (see FIG. 1), into constituent pilot signal components. Under control of aircraft processor 138, pilot receiver 123 monitors all pilot channels, and passes a pilot signal data stream, and other information to aircraft processor 138 from which signal strength and Doppler frequency shift error are calculated. Aircraft processor 138 then utilizes this information in selecting the base station that will provide optimal reception. Aircraft processor 138 also designates which voice channels of that base station the aircraft is to utilize. Power supply 147 converts three phase 400 Hz aircraft power to the power required by the aircraft system.

As discussed above, each base station, through its primary or secondary broadcast transmitter 96, 97 (see FIG. 3), broadcasts a pilot data stream for receipt by all aircraft systems within range of the base station. Each of these streams of data represents a message which is continually repeated and updated as necessary. A single message may extend over several of the above-discussed time slots. Generally speaking, the message includes channel availability information which aircraft systems use in deciding which voice channels to communicate upon.

Referring now to Table 1, shown below, the pilot data stream and its syntax will be discussed in more detail. Table 1 shows an example of a typical pilot data stream.

TABLE 1

| TYPICAL PILOT DATA STREAM | |
|---|---|
| Reference No. | Data Item |
| 600 | SYNC |
| 601 | SYNC |
| 602 | SYNC |
| 603 | SOM |
| 604 | A |
| 605 | 9 |
| 611 | 3 |
| 606 | GS (1,2) |
| 607 | FS |
| 608 | 1 |
| 608 | 3 |
| 608 | 17 |
| 608 | 39 |

TABLE 1-continued

| TYPICAL PILOT DATA STREAM | |
|---|---|
| Reference No. | Data Item |
| 608 | 41 |
| 607 | FS |
| 606 | GS (1,2,3,4,5,6,7) |
| 607 | FS |
| 608 | 1 |
| 608 | 5 |
| 606 | GS |
| 608 | 1 |
| 608 | 10 |
| 607 | FS |
| 609 | EOM |
| 610 | CS |

The base station broadcasts a number of segments of encoded information which make up the pilot data stream. First of all, there are several predetermined alpha numeric synchronization codes 600, 601, 602 that the aircraft system uses as precursors for transmission of the main pilot data stream. The synchronization codes allow an aircraft system to orient itself to the presence of a pilot data stream message. Once such presence has been established, the various segments of encoded information may be extracted from the pilot signal. In addition, the synchronization codes are configured to aid the synchronization of aircraft system timing with the above-discussed time multiplexing scheme utilized in connection with transmitting and receiving pilot signals. Such synchronization codes may, for example, include a lengthy alternating sequence of logical ones and zeros. The remaining segments of the pilot data stream message are then configured so that the synchronization patterns cannot occur therein. Thus, due to the configuration of the synchronization codes, a very high probability exists that an aircraft system will determine it has received valid data only when it is closely synchronized with the multiplexing scheme. Following the synchronization codes, the base station broadcasts a start of message (SOM) code 603 that identifies the beginning of the pilot data stream.

Figure 5:
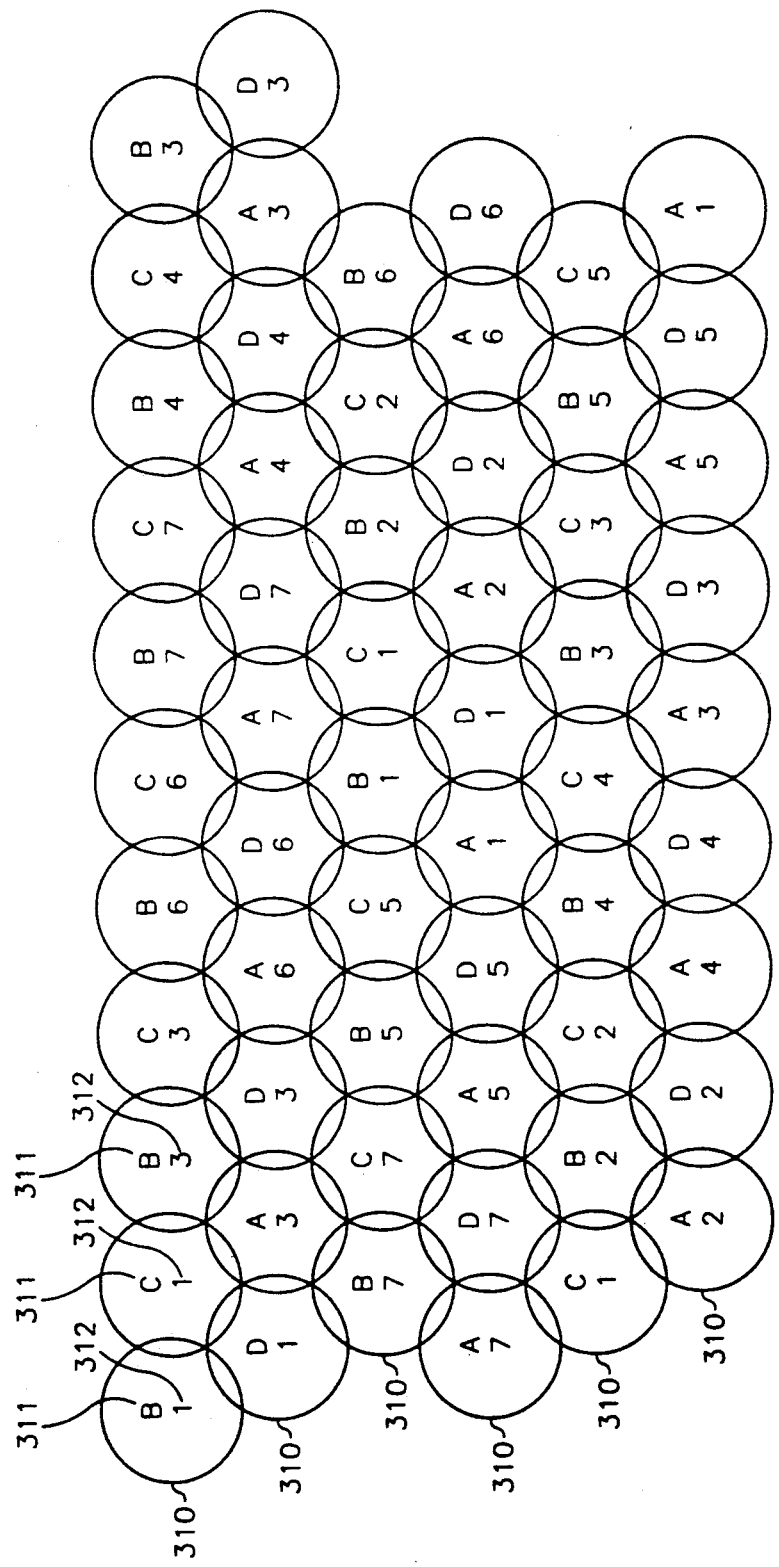
FIG. 5 represents a horizontal cross-section of the propagation pattern of the signals from a large plurality of base stations of the present invention.

Next, a broadcast signal code 604 is broadcast. The broadcast signal code comprises a letter which identifies the frequency channel used by the pilot signal. FIG. 5 illustrates a preferred pilot frequency channel allocation scheme which permits the simultaneous use of identical pilot frequency channels at diverse locations within the geographic area covered by the system of the present invention. FIG. 5 illustrates a geographic area covered by the present invention. A plurality of base station ranges 310 are depicted as identical circles. The frequency allocation scheme provides for pilot signals of five distinct frequencies within the allotted spectrum to be broadcast by respective base stations located within ranges 310. These frequencies will be referred to as A, B, C, D, and E, each frequency referenced by numeral 311 and appearing within base station ranges 310. The "E" stations are located at airports and serve only the aircraft that are unable to receive pilot signals from any other base station. It is one of the letters A, B, C, D, or E which comprises broadcast signal code 604.

With continued reference to FIG. 5, the A, B, C, and D in-route stations are positioned so that base stations broadcasting on the same pilot frequency are located as far apart as possible. In this way, the same pilot frequencies are re-used by a plurality of geographically distant base stations, thereby conserving frequency spectrum. In addition, each pilot signal is broadcast in 1 of 8 separate time slots, designated by numeral 312. Since each base station broadcasts its pilot signal on a particular frequency at a particular time, the incidence of pilot signals from nearby base stations interfering with each other is essentially eliminated.

Referring back to Table I, after transmission of broadcast signal code 604, the base station identification number 605 is broadcast. Each base station is provided with such a number to uniquely distinguish it from the other base stations. Next, the base station broadcasts a numerical activity index 611. This number ranges from zero to nine and indicates the fraction of the base station's allocated channels that are then currently in use. When an aircraft system determines that two or more base stations have equal suitability, such as generally equivalent signal strength and Doppler shift parameters, the base station with the lowest activity index is selected.

Next, a pilot group separator/identifier (GS) 606 is broadcast. A pilot group separator/identifier 606 comprises the identification numbers of one or more base stations. The list of base stations broadcast at any single pilot group separator/identifier specifies a unique "radio horizon." Radio horizons are discussed in more detail below. Following a pilot group separator/identifier 606, the base station broadcasts a field separator 607. Pilot groups and associated channels for other service providers can be included in the data stream, based on activity information received via the local private line network (FIG. 3). Field separators 607 identify and separate different data fields within a pilot data stream message.

After a field separator 607 for each pilot group, one or more voice channel identifier codes 608 are broadcast. Each voice channel identifier code 608 identifies a single voice channel which is associated with the particular pilot group that preceded it. After a list of voice channel identifier codes 608, other pilot groups' separator/identifiers 606, field separators 607 and voice channel identifier codes 608 are broadcast as described above until pilot groups for all radio horizons which may potentially include the base station have been broadcast.

After the base station has broadcast pilot group information for all potential radio horizons within which the base station may be included, an end of message code 609 is broadcast. Following end of message code 609, a checksum code 610 is broadcast. Checksum code 610 is used by the aircraft system in determining if the pilot data stream was accurately received.

The various pilot groups and associated voice channels are broadcast so that aircraft can select the voice channels that are optimal for the aircraft's unique altitude and position. Specifically, each pilot group is uniquely associated with a radio horizon that includes the base station from which the pilot signal is being broadcast. The radio horizon characterizes the relationship between aircraft altitude and potential frequency channel interference. Generally speaking, many different radio horizons are associated with each base station.

Figure 6:
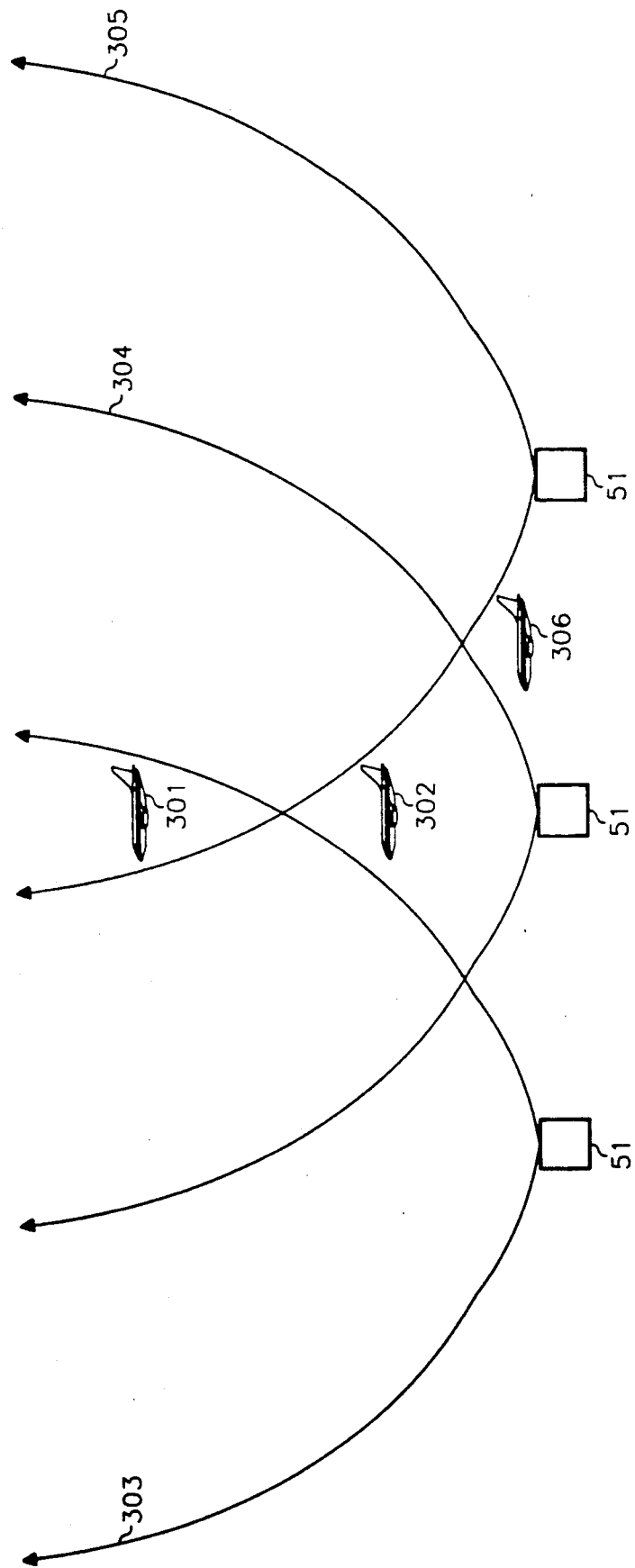
FIG. 6 represents a vertical cross-section of the propagation pattern of signals from three base stations of the present invention.

Referring now to FIG. 6, the relationship between aircraft altitude and quality of pilot data stream reception will be discussed. Three geographically spaced base stations 51 are represented by propagation patterns 303, 304, 305. Because the base station signals travel both vertically and horizontally from their origin, a horizontal cross section of these signals resembles a circular area (see FIG. 5) that increases with altitude.

This outward propagation pattern results in overlapping base station coverage at higher altitudes. In other words, a single aircraft at a high altitude, such as the position designated by 301, might receive pilot signals from all three stations. Alternatively, an aircraft flying at a low altitude such as that designated by position 306 might receive no pilot signal.

If an aircraft initially flying at position 301, which is within the range of propagation patterns 303, 304, and 305, descends to a lower altitude, e.g., position 302, the aircraft would lose all but signal 304. Thus, an aircraft's radio horizon is defined by the base stations 51 for which the aircraft can receive pilot signals. Consequently, it is important that an aircraft initiate communication with the base station furthest in front of the aircraft within its radio horizon.

Figure 7:
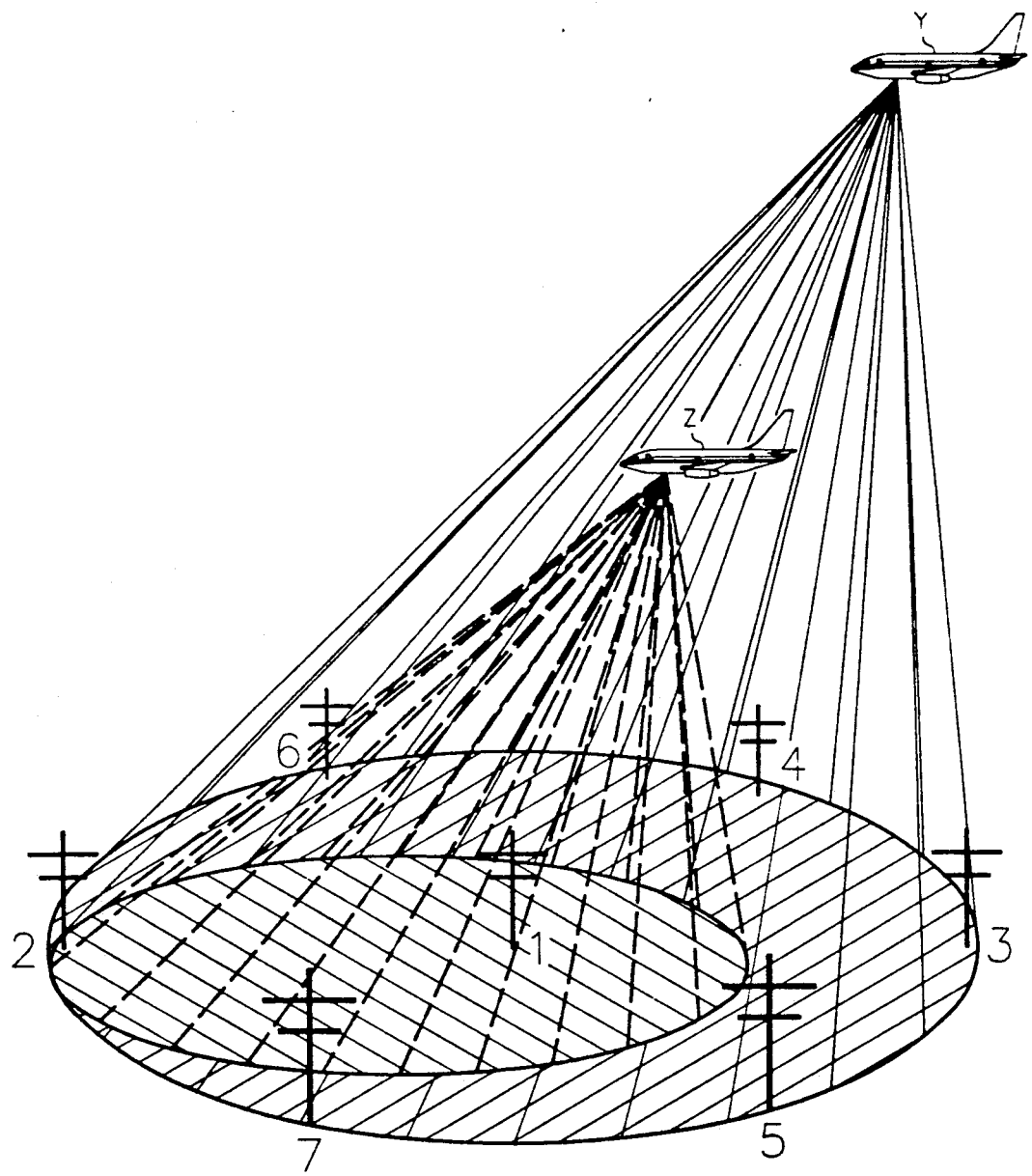
FIG. 7 represents a perspective view of radio horizons for two aircraft.

FIG. 7 illustrates that the radio horizons of two aircraft, designated as Y and Z, are a function of their respective altitudes relative to base stations (numbered 1-7) in the vicinity of the aircraft. In the example presented in FIG. 7, aircraft Z can receive pilot signals from only base stations 1 and 2, while aircraft Y can receive pilot signals from each of base stations 1-7. The difference in reception area is caused by the difference in altitude of the aircraft. Both aircraft will preferably select base station 2 as being optimal because it is the furthest in front. However, aircraft Y will recognize that its radio horizon is defined by base stations 1-7, and aircraft Z will recognize that its radio horizon is defined by base stations 1-2. Consequently, aircraft Z selects a voice channel which is associated with the pilot group having the pilot group separator/identifier 606 (see Table I) that identifies base stations 1-7. On the other hand, aircraft Y will select a voice channel which is associated with the pilot group having the pilot group separator/identifier 606 that identifies base stations 1 and 2.

The channel selection is accomplished by the aircraft processor. The aircraft processor matches the pilot signals that it can then currently receive to the identified pilot groups within the pilot data stream of base station number two. This matching technique makes it unnecessary for the aircraft to test all in-range base stations for possible interference before acquiring a channel. However, an alternative method exists for preventing interference, wherein each base station would be in contact with all other possible in-range base stations, to coordinate their channel availability. The latter technique is made unnecessary by the first described technique.

The voice channels associated with each pilot group fulfill two requirements. First, they are then currently available for use in placing a call between a base station and an aircraft. Second, they are associated with their respective radio horizon so that, if they are used by an aircraft having the specified radio horizon, no frequency channel interference will result. In other words, they will not be further used by any other base station within the vicinity.

Appropriate pilot groups and associated voice channels are assigned by the central processor to each base station, having been selected in view of the central processor's historical database. Aircraft pass over base stations at scheduled times and altitudes. The resulting call traffic from the aircraft is therefore as predictable as the aircraft schedules.

As calls are placed from aircraft, corresponding radio horizon information is transmitted to the selected base station as part of each call. This information is periodically sent to the central processor for incorporation in its database. The database is analyzed by the central processor during daily allocation planning. The call data allows each base station's allocation to be proportionally subdivided into radio horizon groups, further improving spectrum efficiency.

The central processor also uses historical data to determine directions of travel for aircraft transmitting to base stations. The radio horizon information includes signal strength and Doppler information for each pilot within range at the start of the call. Over time, this information identifies standard flight paths for each base station's coverage area. In this way the central processor determines which base stations are ahead of the aircraft but out of its range at the start of the call. The central processor can allocate channels that are clear in front of the expected line of travel, rather than clearing channels in all possible directions. This improves the reuse of radio spectrum while still preventing aircraft with calls in progress from flying into range of aircraft on the same frequency through a different base station.

Referring now to Table II, a pilot data stream table maintained in the aircraft system will be described.

TABLE II

AIRCRAFT PILOT DATA STREAM TABLE

| Base Station | Rating | Data Stream Information |
| --- | --- | --- |
| 9 | 1 | 1, 2, 3, 4, 5, 6 |
| 8 | 2 | 45, 46, 47, 48, 49, 50 |
| 6 | 2 | 31, 32, 33, 34, 35 |
| 1 | 2 | 88, 89 |
| 2 | 3 | 22, 23, 25 |
| 18 | U | 14, 15, 16 |

The aircraft system maintains an updated pilot data stream table which primarily serves to list the pilot signals within its radio horizon, their ratings, and the voice channels associated therewith. An example of the type of data compiled appears in Table II.

The first column, entitled "Base Station", lists the identifying numbers of the base stations within range of the aircraft system. Such numbers are obtained from codes 605, discussed above in connection with Table I. These base stations appear in order from best to worst, as sorted by the base station selecting routine illustrated in FIG. 19.

The second column, entitled "Rating", contains ratings of the base stations listed in the first column. The acceptability ranking is computed in the base station selecting algorithm. The aircraft system assigns a rating of 1, 2, 3, 4, or U to the base stations within its radio horizon, where 1 is the most desirable and 4 is the least desirable. The only acceptable ratings comprise 1 and 2. U is the rating attached to the base stations which broadcast their pilot signals on frequency E, since these are designated solely for aircraft having no other base signals within range.

The third column, entitled "Data Stream Information", lists other information such as activity indexes 611, broadcast signal codes 604 from various base stations, and voice channel numbers.

Figure 8:
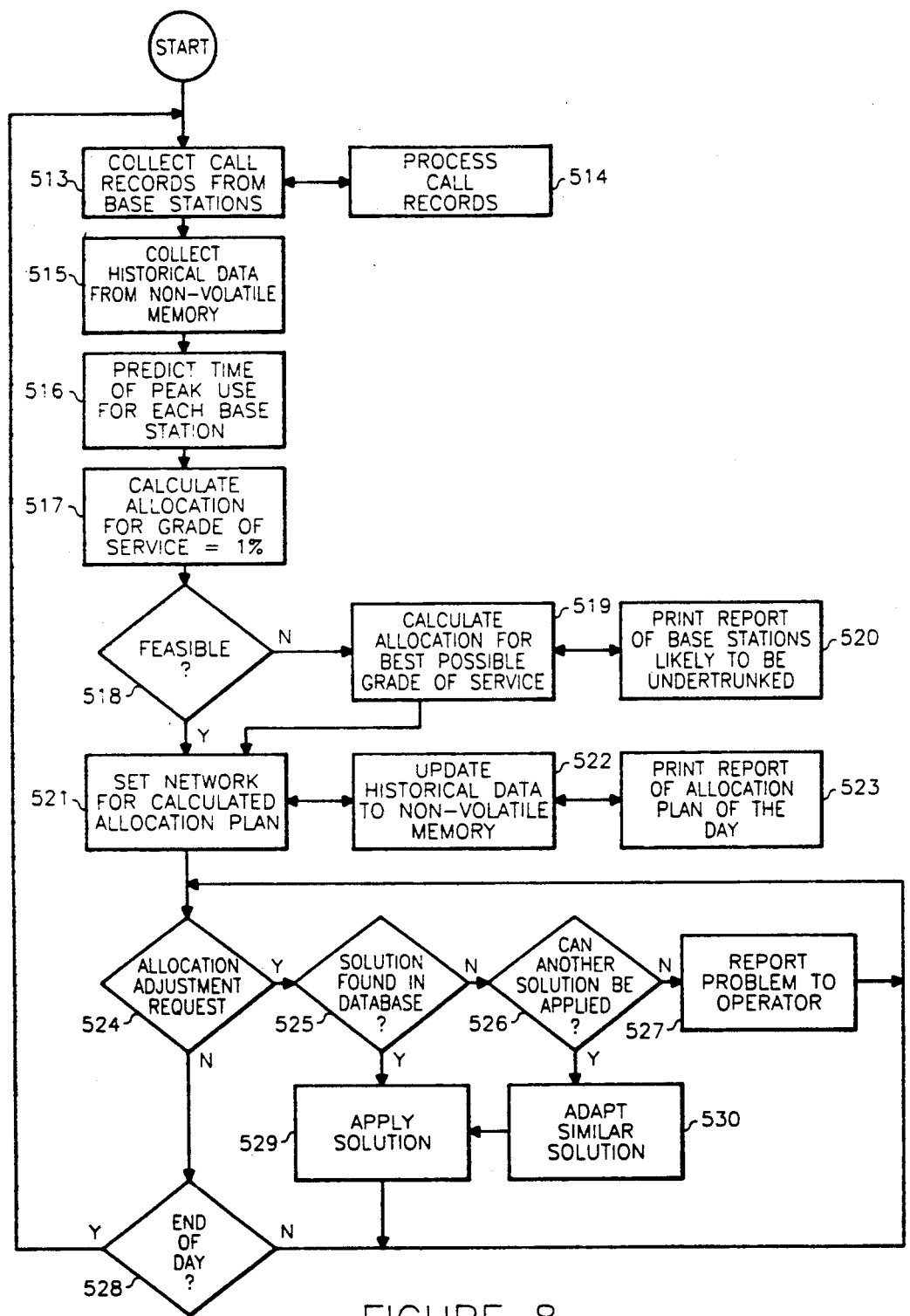
FIG. 8 is a flowchart of the daily allocation cycle used by the central processor of the present invention.

Referring now to FIG. 8, preferred software of the central processor will be described. The software of the central processor has a number of functions, one of which is to dynamically allocate radio frequency spectrum to the plurality of base stations. When a base station requests assignment of additional voice channels from the central processor, the central processor effectively redistributes blocks of frequency or frequency channels, removing voice channel assignments from one or more less active base stations and reassigning these voice channels to the requesting base stations, after donor base stations have acknowledged the frequency assignment transfer. Another function of the central processor software is to maintain a comprehensive database of system information. This database contains information such as a listing of the base stations, the maximum number of frequency channels allocatable in the base stations, a "map" of the assigned frequency spectrum for the system, and historical information about the base stations, such as projected peak hours and the distribution of allocated channels among radio horizon groups.

FIG. 8 shows how the daily allocation cycle of the central processor operates. This program enables the system to operate as an "expert" system, because it uses an accumulation of information in order to solve problems that arise. However, this program starts with simple rules.

Before the central processor is brought on-line for the first time, an operator stores a nominal set of rules in the central processor's database. The central processor will use these rules, or "solutions", in allocating frequency spectrum among the base stations when certain problems arise.

First, task 513 collects call records of previous call activity from the plural base stations using the call record collecting routine described later in conjunction with FIG. 9. Task 513 uses a procedure 514 to process these call records. Procedure 514, which is described later in conjunction with FIG. 10, prepares the activity records for use in billing.

After task 513, task 515 collects historical data of the base stations from non-volatile memory of the central processor. Using the call records of the base stations' previous day and the historical data from the base stations, task 516 statistically analyzes this information and predicts the time of peak use for each base station during the upcoming day. The present invention contemplates the use of several types of statistical analysis in this prediction. For example, the prediction may simply adopt the previous day's activity as a prediction for the upcoming day. Alternatively, if desired, the prediction may account for weekly, seasonal, and trend patterns using techniques well known to those skilled in the art.

Next, task 517 uses the previously analyzed data in order to calculate a voice channel allocation for the base stations that would provide a grade of service equal to 0.01. A grade of service equal to one percent indicates that the possibility of a user encountering a busy signal would be equal to 1%. The process includes allowing for prescribed portions of spectrum designated for other spectrum users.

Query 518 determines whether or not a grade of service of one percent is feasible. If the answer to query 518 is negative, task 519 calculates the voice channel allocation for the highest possible grade of service. In calculating voice channel allocation, those skilled in the art will recognize that a three dimensional map may be constructed in computer memory to represent the earth's surface area over which the system is intended to operate and the various altitudes above the earth at which cooperating aircraft fly. The calculations may simply simulate all possible allocations of voice channels within this three dimensional map and select the most optimal solution simulated. However, linear programming techniques well known to those skilled in the art are preferably utilized to arrive at an acceptable solution in less time with a given level of computer processing capabilities. During task 519, a task 520 prints a report of the base stations likely to be under-trunked or under-serviced.

Next, task 521 instructs the network of base stations to follow the calculated allocation plan, whether that be for the service grade of one percent or the highest possible grade of service. During task 521, a task 522 updates the historical data to non-volatile memory, and a task 523 prints a report of the allocation plan for the upcoming day.

After task 521 sets up the network for the calculated daily allocation plan, a query 524 waits for any of the base stations to request adjustment of their voice channel allocation. When the entire system is operating, a base station that encounters a problem which is not provided for within the allocation for that day can contact the central processor to report the problem. Problems consist of deviations from the daily allocation plan, and are recognized when channel activity exhausts the allocation.

When query 524 determines that a request for allocation adjustment has been made by a base station, query 525 asks whether or not a solution for this particular problem already exists in the database. A typical repeating problem would result from the closure of major airport due to weather conditions. In that event, the base station serving the airport (type E) would experience a rapid rise in calling activity. The central processor would recognize the allocation adjustment request, task 524, as a local problem that could have a nationwide effect. Likewise, if ground and boarded passengers at an airport are notified of a group hold, that results in a rapid increase in channel demand. Aircraft scheduled to depart for the closed airport also take ground holds at their respective originating airports to conserve fuel and reduce in-route congestion. Consequently, the in-route base stations between the airports begin to experience a reduction in call activity making their channels available for reallocation to the airports where holding aircraft are located.

Task 525 may again employ a map of the earth's surface area serviced by the present invention to recognize whether a particular problem has been analyzed to achieve a solution, where a solution represents a new allocation scheme for the service area of the present invention. A problem may be characterized by indicating the quantity and locations of requests for allocation adjustments on the map. Then, after the problem has been recognized and characterized, the central processor may calculate a solution which would solve the problem. This calculation may occur hours, days, or months after the problem is recognized. Thus, such calculations may simply simulate all possible allocations of voice channels and select the most optimal solution simulated, or use more sophisticated conventional linear programming techniques to achieve a solution faster. A solution need not be calculated within any specific time deadlines. Once a solution has been calculated, it is stored in association with the map that identified the problem to which it is a solution.

Task 525 then compares the map of a current problem with the maps stored in the central processor's database to determine if a solution is found in the database. This comparing may advantageously utilize conventional pattern recognition techniques well known to those skilled in the art of artificial intelligence. When closely matched patterns between stored maps and currently evolving maps emerge, the central processor begins reallocating channels, as in task 529, in accordance with the solution stored in the central processor's database.

In effect, the central processor anticipates the disturbance throughout the network, before it occurs, by recognizing a single problem report as the beginning of a disturbance pattern. The ripple effect of an airport closure is as predictable as the commercial airline schedules. The solution to the problem includes the identification of in-route base stations that will have lower than expected demand caused by the ground holds. These stations will be contacted by the central processor and instructed to release their idle spectrum for reassignment.

When flight operations resume at the problem source airport its call activity begins to drop. The surrounding in-route stations will experience a rise in call activity. The central processor will recognize this as another pattern and begin reallocating channels back to the in-route base stations ahead of demand as ground hold aircraft throughout the country are released.

The closure of a single runway can also create disturbance pattern similar to a complete closure, the difference merely being one of magnitude. The central processor will be able to apply the complete closure solution by reallocating fewer channels, using task 530.

On the other hand, task 525 may fail to find a closely matched pattern in the database for the central processor. For example, a first problem occurrence, as a negative answer to task 525, at Chicago's O'Hare airport at 10:00 A.M. on a Tuesday in June may not closely match existing recognized problems. Nevertheless, a solution to this first problem occurrence may have a solution similar to one that worked for a schedule disturbance during, for example, April on a Friday at 5:00 P.M. The central processor will test, using query 526, the suitability of the April solution for June's problem by comparing surrounding base stations for similar activity levels. If there is sufficient similarity, the central processor will modify (task 530) that solution and apply the solution, as in task 529, using available idle channels. This similarity identification minimizes the number of first occurrence solutions that have to be developed and maintained. On the other hand, if no solution is near enough to the present problem for application, then no re-allocation occurs and the base station continues to operate in accordance with its current plan of the day, even though call blockage may occur.

However, to prevent the same problem from blocking calls a second time, task 527 reports the existence of a problem so that an operator can manually create new rules to solve the problem. After task 527 reports the problem to the operator, control returns to task 524 to wait for more allocation adjustment requests. Most allocation problems can be solved by human observation in a few minutes and tested by computer simulation in a few seconds. Therefore, when a specific problem arises a second time, and the operator has entered rules that solve that problem into the central processor, the central processor can apply the solution without intervention or delay.

Query 528, which is performed when query 524 does not detect an allocation adjustment request, determines whether the end of the day has been reached. If not, task 524 continues waiting for allocation adjustment requests. If the end of the day has been reached, the program restarts at task 513 to begin a new day.

Figure 9:
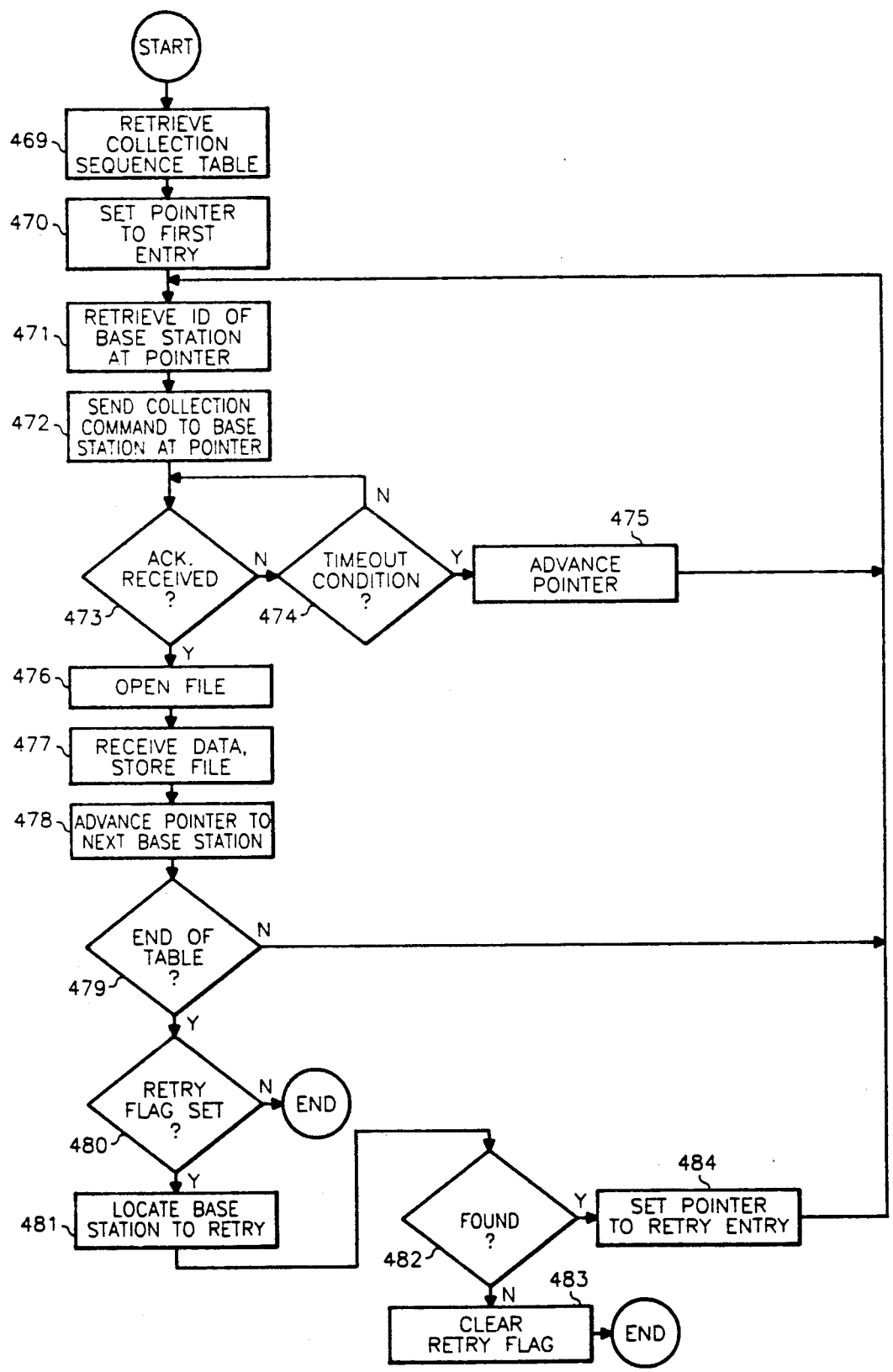
FIG. 9 is a flowchart of the call record collecting routine executed by the central processor of the present invention.

Referring now to FIG. 9, the call record collecting routine discussed above in connection with task 513 of FIG. 8 will be described. First, task 469 retrieves a collection sequence table from memory. This table contains the order in which the central processor will collect activity records from the various base stations. This sequence depends upon the unique characteristics of each base station, and is formulated to access particular base stations when statistics indicate that their call traffic will be at a minimum.

After task 469, task 470 sets a pointer to the first entry of the collection sequence table, and task 471 retrieves the identification number of that base station. Then, task 472 sends the base station a request for collection of its records.

Query 473 determines whether or not an acknowledgment of the record collection command has been received from the base station. If not, query 474 determines whether or not a predetermined time limit, placed on the time to wait for a message, has been exceeded. Exceeding this time limit is known as a "timeout condition". If timeout has occurred, task 475 advances the pointer to the next base station and returns to task 471. Otherwise, if a timeout condition has not occurred, the program continues waiting for receipt of an acknowledge message in task 473.

Once the acknowledge message has been received, task 476 opens a file for storage of the requested records. When the records are received from the base station, task 477 performs an error check and stores the records in the newly opened file.

Since this process completes record collection for only a single base station, task 478 then advances the pointer to the next base station in the table. Then, query 479 determines whether the end of the table has been detected. If not, control returns to task 471 for processing of the next base station.

When the end of the table has been reached, query 480 tests for a retry flag. A retry flag indicates that the program was unsuccessful in collecting records of one or more base stations. If no such flag is found in query 480, the program ends. Otherwise, task 481 attempts to identify the one or more base stations that require re-examination.

Query 482 asks whether or not the base stations have been identified. If the answer is negative, task 483 clears the retry flags and the routine ends. But, if the base stations requesting re-examination can be located, task 484 sets the pointer to the first entry to be re-examined and returns to task 471.

Figure 10:
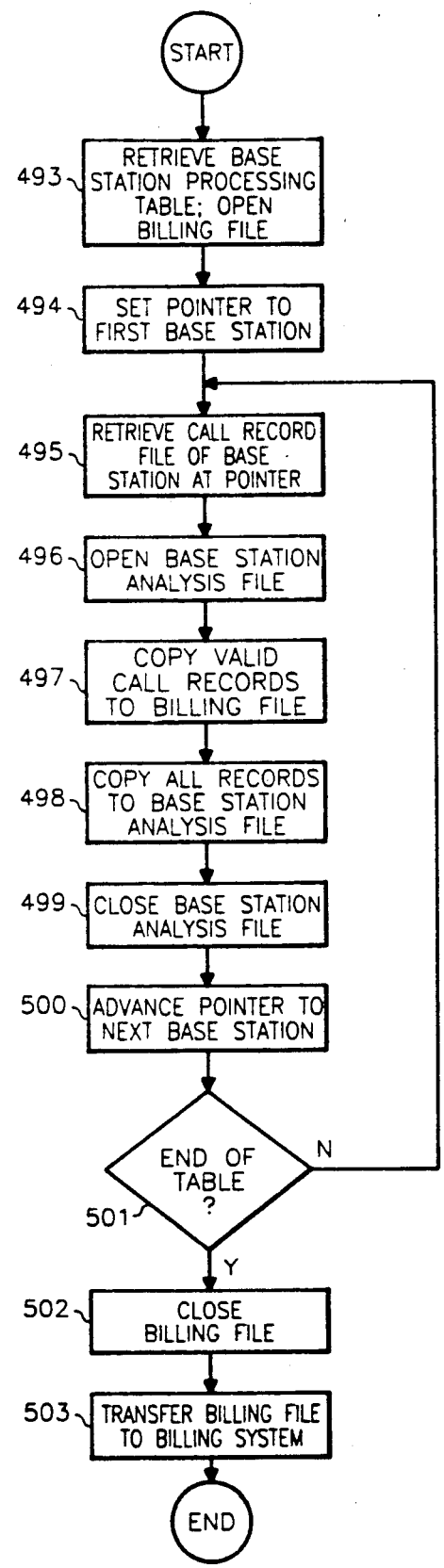
FIG. 10 is a flowchart of the call record processing routine executed by the central processor of the present invention.

Referring now to FIG. 10, the call record processing routine of the central processor (task 514 in FIG. 8), which is performed after the call record collecting routine of FIG. 9, will be described. This routine copies pertinent call records from the plurality of base stations into a billing file and an analysis file. The billing file is used by billing system users, and the analysis file helps the central processor interpret activity statistics of the base stations.

Task 493 retrieves the base station processing table, which contains a sequence in which the program processes the base station call records. In addition, task 493 opens a billing record file. Then, task 494 sets a pointer to the first base station on the base station processing table. Task 495 retrieves the call record file of the base station currently at the pointer.

Task 496 opens a base station analysis file for the base station currently pointed to. Then, task 497 copies the valid call records of the base station at the pointer to the billing file and task 498 copies all call records of the current base station to the base station analysis file for use by tasks 515-516 (see FIG. 8). Finally, task 499 closes the base station analysis file.

Task 500 advances the pointer to the next base station listed in the base station processing table. Then, query 501 asks whether or not the end of the table has been reached. If the answer is negative, control is returned to task 495 to process another base station. When the end of the table has been reached, task 502 closes the billing file, task 503 transfers the billing file to the billing system, and the program ends.

Figure 11:
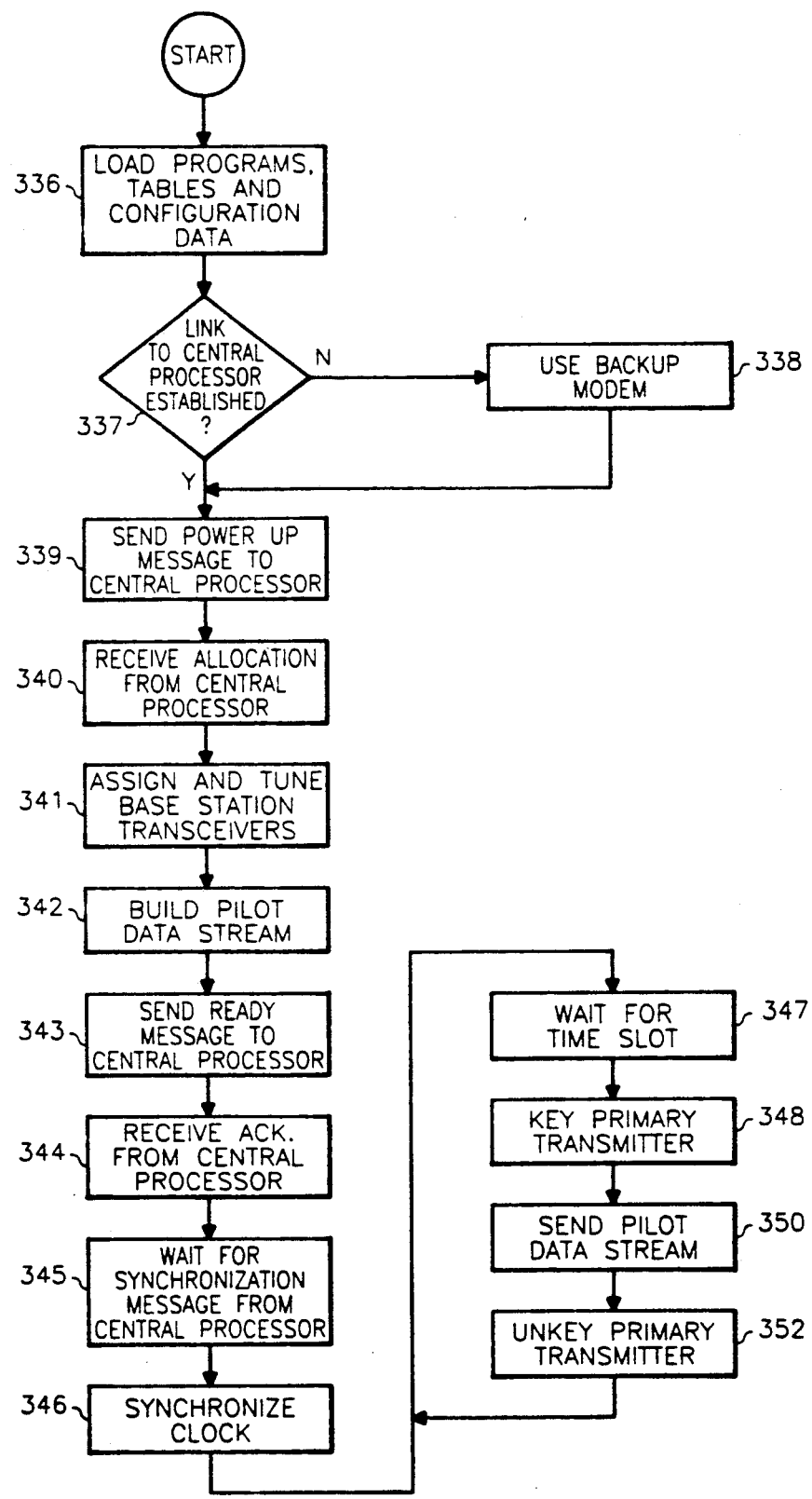
FIG. 11 is a flowchart of the routine executed when a base station of the present invention receives power.

Referring now to FIG. 11, the base station software will be described, beginning with the base station power-up routine. Although under normal system operation each base station continually receives power, in the event power is removed from a base station that base station initially performs the base station power-up routine upon power restoration.

The routine begins at task 336, which loads base station programs, tables, and configuration data. Query 337 determines whether or not the normal private line network link between the base station and the central processor is intact. If that link has been broken, task 338 uses backup modem 118 (see FIG. 3) to restore communications with the central processor. After an affirmative answer to query 337, or alternately, after completion of task 338, task 339 is executed. Task 339 transmits to the central computing system facility a message indicating that the base station has recently undergone restoration of power.

Next, task 340 receives from the central processor an allocation of voice channels for the day. Based on the assignment of these voice channels, task 341 then assigns the base station's transceivers to particular voice channels and tunes them accordingly by issuing appropriate commands to transceivers 91 (see FIG. 3). Then, task 342 constructs the pilot data stream table for the base station. The pilot data stream table includes the codes discussed above in connection with TABLE I. Upon initial power-up, all allocated voice channels are listed as being available.

Task 343 then sends a message to the central processor indicating the base station's ready state. Task 344 receives an acknowledge message from the central processor, confirming the receipt by the central processor of the base station's ready message. Then, task 345 waits for a synchronization message from the central processor. In task 346 the base station receives this synchronization message. This synchronization message allows task 346 to match the base station's internal time base to the time base of central processor 52 using conventional techniques. When task 346 is performed within all base stations 51, all base stations 51 have then synchronized their internal time bases to the time base of central processor 52. Hence, all base stations 51 are also synchronized with each other. By synchronizing the time bases of all base stations 51 together, diverse time slots assigned to different base stations 51 are realized in the previously discussed time multiplexing scheme for pilot signals.

The present invention contemplates frequent communications, on at least a daily basis, between base stations 51 and central processor 52. Each communication may advantageously refresh synchronization by re-synchronizing the time base of the base station 51 to the time base of central processor 52. Thus, synchronization is continuously maintained. After synchronization, task 347 waits for the particular time slot assigned to the base station. Once the proper time slot has occurred, task 348 keys primary transmitter 96 (see FIG. 3).

After task 348, task 350 broadcasts the pilot data stream of the base station. Following task 350, task 352 un-keys primary broadcast transmitter 96. After execution of task 352, the program continues cycling through tasks 347, 348, 350, and 352, thereby periodically broadcasting the base station's pilot data stream at specific intervals.

Figure 12:
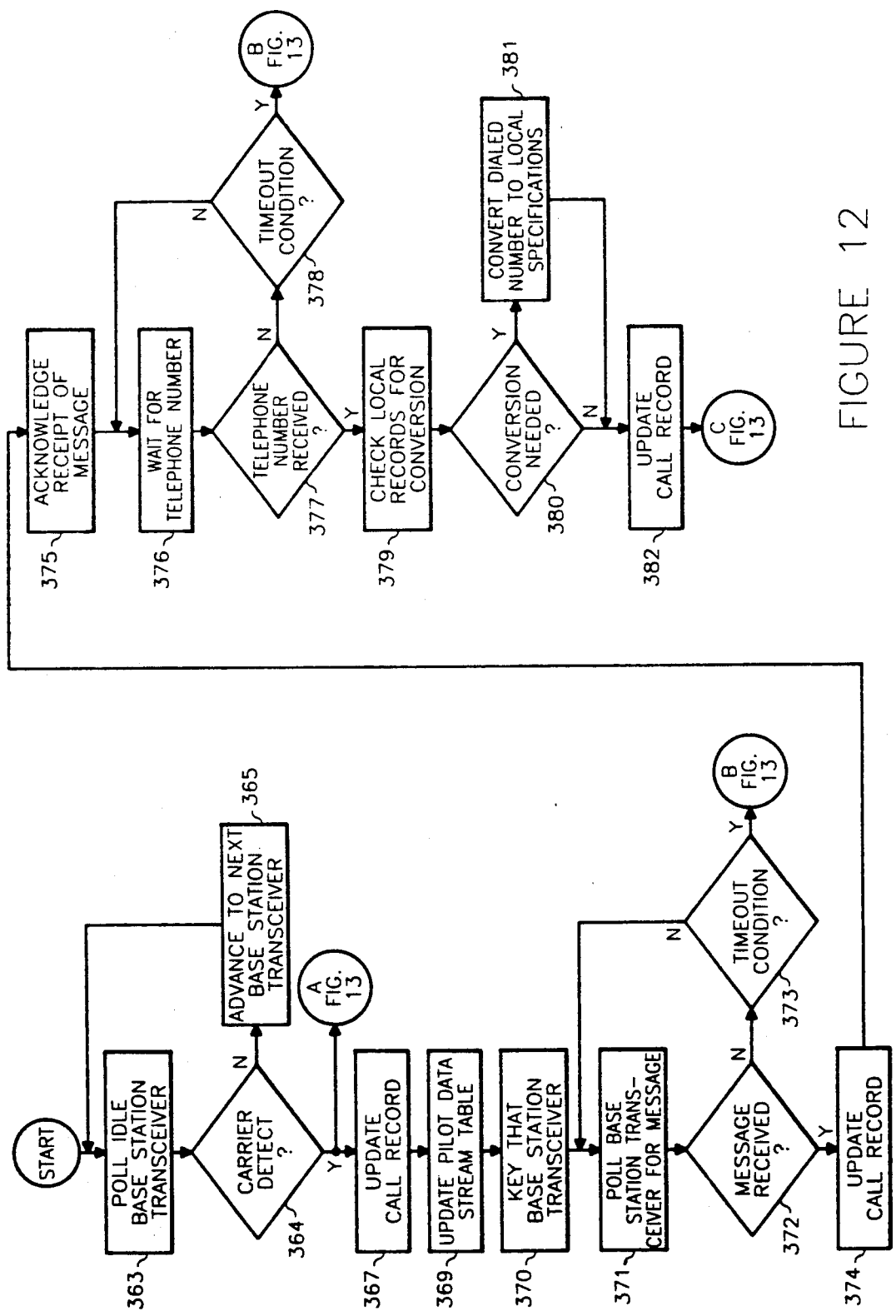
FIG. 12 is a flowchart of a first portion of the call processing routine executed by a base station of the present invention.

Referring now to FIG. 12, the base station call processing routine will be described. This routine continually monitors the base station's transceivers for carrier detect and operates simultaneously with tasks 347–352 (see FIG. 11). Upon receipt of an aircraft system's valid attempt to open communications, the base station call processing routine establishes a communications path between the aircraft and the local PSTN 54.

First, task 363 polls an idle base station transceiver. An idle transceiver is one which has not been previously associated with an ongoing call conducted through the base station. Query 364 determines whether or not a carrier signal was detected on the idle base station transceiver polled in task 363. If the response to query 364 is negative, task 365 advances to the next idle base station transceiver and returns to task 363 to poll that base station transceiver.

However, if a carrier signal was detected in query 364, two procedures are initiated simultaneously. In one of these procedures, control of the program is passed to task 393, described below in connection with FIG. 13. The other procedure, beginning after a carrier signal is detected in query 364, starts at a task 367. Task 367 updates a call record with information describing the initiation of a call. Then, task 369 similarly updates the pilot data stream table to reflect the use of one of the voice channels allocated to the base station. In addition, task 369 updates activity index 611, discussed above in connection with TABLE I. Task 370 then keys the carrier-detecting base station transceiver in order to respond to the aircraft system's request to open communications.

Task 371 polls the base station transceiver for receipt of a message from an aircraft transceiver. Query 372 determines whether or not a message was received via polling of the base station transceiver. If the answer is negative, query 373 determines whether or not timeout has occurred. If a timeout condition has occurred, the program proceeds to task 400, shown in FIG. 13 and discussed below. Otherwise, in the absence of a timeout condition, control returns to task 371 for continued polling of the base station transceiver for a message.

If query 372 detects a message at the base station transceiver, task 374 accordingly updates the call record with the detected message. Then, task 375 transmits an acknowledge message to the aircraft transceiver in order to confirm receipt of the message.

Then, task 376 polls the base station transceiver for receipt of the telephone number which the airborne user has dialed. Query 377 determines whether the entire telephone number has been received by the base station transceiver. If not, query 378 determines whether a timeout condition, in the process of waiting for the telephone number, has occurred. If a timeout condition has occurred, the program proceeds to task 400, shown in FIG. 13 and discussed below. In the absence of a timeout condition, the program continues waiting at task 376 for receipt of the telephone number. When query 377 determines that a telephone number has been received, task 379 examines local records of the base station to determine if a conversion of the telephone number to local protocol is necessary. If, for example, the airborne caller is currently located in the same area code as the telephone number being dialed, the program may need to suppress the area code from the dialed digits. Query 380, then, determines whether or not such a conversion is needed. If the answer is positive, task 381 converts the dialed telephone number to the proper specifications. After task 381, or in the event of a negative answer to query 380, task 382 accordingly updates the call record, and proceeds to a task 383, shown in FIG. 13.

Figure 13:
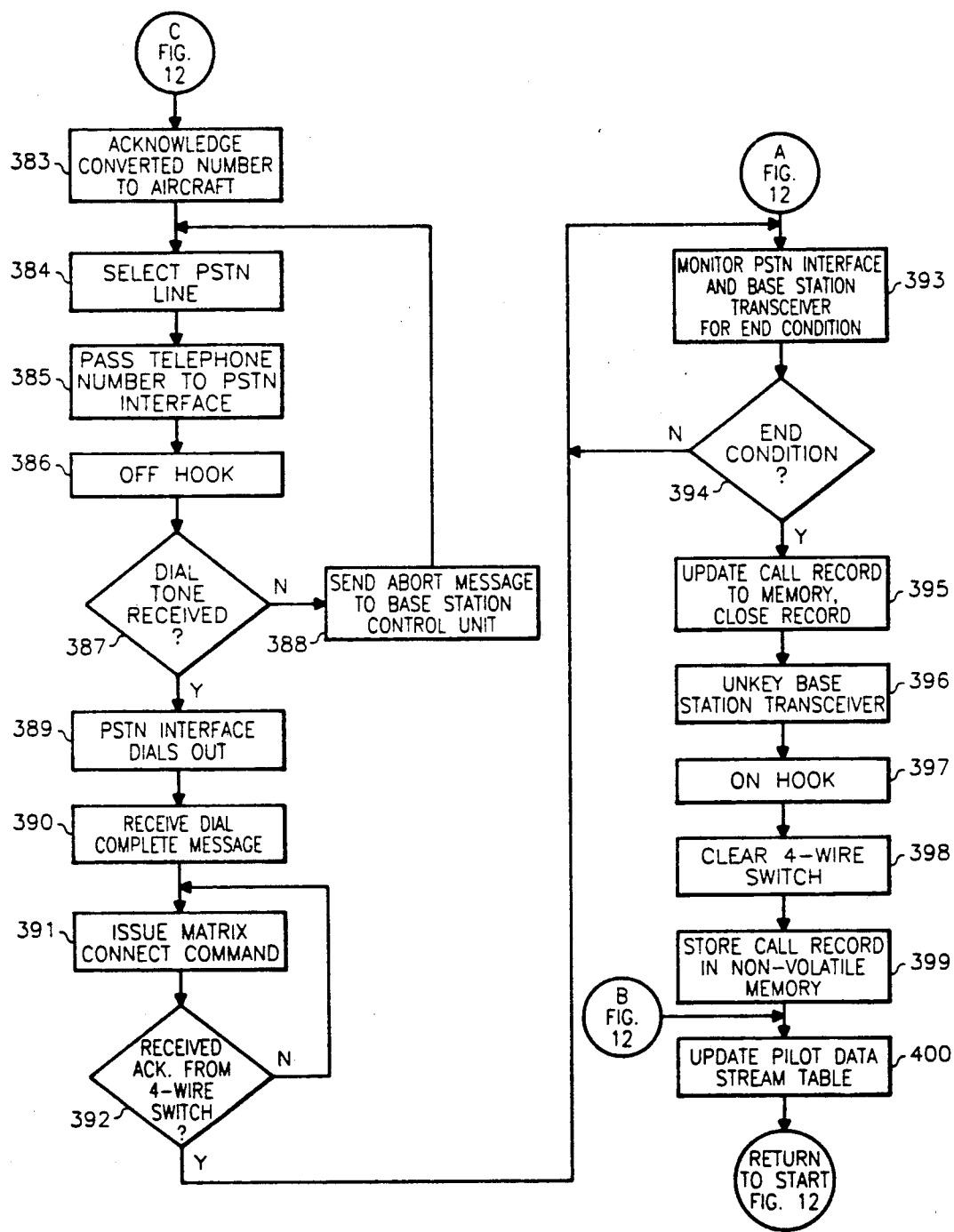
FIG. 13 is a flowchart of a second portion of the call processing routine executed by a base station of the present invention.

Turning now to FIG. 13, the program continues at task 383. Task 383 acknowledges, to the aircraft, receipt and conversion of the dialed telephone number. Then, task 384 selects a PSTN line. Task 385 passes the converted telephone number to the PSTN interface. Task 386 then initiates an "off hook" condition.

Query 387 determines whether or not a dial tone has been received. If no dial tone is received, task 388 sends an abort message to the base station control unit and returns to task 384 in order to select another PSTN line. However, if the dial tone is received as detected in query 387, task 389 executes. In task 389, the PSTN interface dials out to the PSTN. In task 390 a "dial complete" message is received, indicating that the PSTN interface successfully dialed and was connected to the telephone number. When the base station has successfully established contact with the local PSTN, task 391 issues a "matrix connect" command, which connects the desired base station transceiver to the selected PSTN line.

Query 392 determines whether or not an acknowledgment from the four wire switch was received. Such an acknowledgment is normally expected in response to the issuing of a "matrix connect" command. If the answer to query 392 is negative, task 391 is again executed. Otherwise, the program proceeds to task 393 which monitors the PSTN interface and base station transceiver for an end condition.

Query 394 determines whether or not an end condition has been received. If such a condition has not been detected, task 393 continues monitoring the PSTN interface and base station transceiver for an end condition. In other words, while a call is in progress base station 51 continues to perform task 393 with respect to that call. Otherwise, if some condition indicates that the call has ended, task 395 updates and closes the call record.

Next, task 396 un-keys the base station transceiver. Task 397 initiates an "on hook" condition. Next, task 398 clears the four-wire switch. Then, task 399 stores the call record in non-volatile memory. Task 400 appropriately updates the pilot data stream table to reflect availability of the base station transceiver previously used in conducting the call. Finally, program control is returned to task 363 (described previously with FIG. 12) which re-starts the base station call processing routine.

Figure 14:
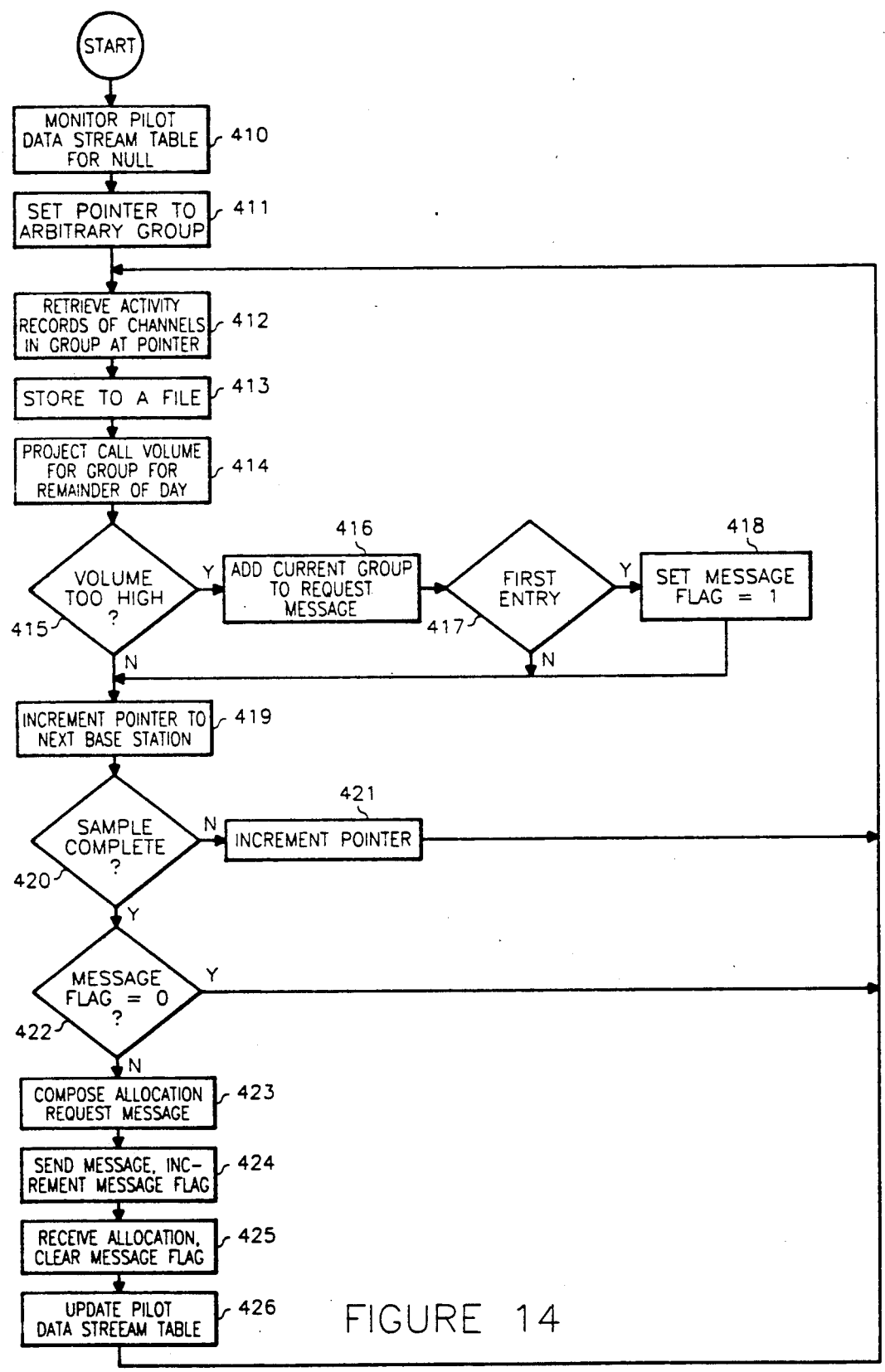
FIG. 14 is a flowchart of the allocation requesting routine executed by a base station of the present invention.

Referring now to FIG. 14, the base station allocation requesting routine will be described. This requesting routine may be performed in a background mode on a periodic basis. Each base station runs this routine so that allocation of additional voice channels can properly be requested from the central processor as such needs arise. The program commences at task 410, which monitors the pilot data stream table for the appearance of an empty pilot group, i.e., a particular pilot group with no voice channels assigned to it. Task 411 arbitrarily sets a pointer to a pilot group currently assigned to that base station. Then, task 412 retrieves the activity records from the voice channels associated with the pilot group where the pointer is currently pointing. Task 413 stores these records in a list along with the other pilot groups' activity records so that the base station can quickly access the data upon polling by the central processor.

Using these activity records, task 414 calculates the projected call volume for the remainder of the allocation period for the pilot group currently at the pointer. The present invention contemplates the use of a diverse range of calculations in task 414. For example, task 414 may simply adopt historical data for the projection. Alternatively, task 414 may examine the length of time for which the entire number of allocated voice channels at that base station have been in use. If that length of time exceeds a predetermined value, then a maximum call volume may be projected. Task 414 may perform these or other projection techniques known to those skilled in the art.

Query 415 determines whether or not the projected call volume is within acceptable bounds. If the answer to query 415 is affirmative, task 416 adds the identity of the current pilot group to the request message which will be broadcast to the central processor after the base station has assessed its needs. After task 416, query 417 determines whether or not the pointed-to-pilot-group is the first entry. If the answer to query 417 is affirmative, the message flag is set to a value of 1 in task 418, and control proceeds to task 419. A value of one or more stored in the message flag indicates that a condition exists at the base station that requires attention from the central processor. If the answer to query 417 is no, control passes directly to task 419 which increments the pointer to the next pilot group.

Query 420 determines whether or not the pointer has completed the cycle through all pilot groups, thus completing a sample. If the sample is not complete, task 421 increments the pointer and returns to task 412. Otherwise, after the sample has been completed, query 422 determines whether or not the message flag (discussed previously with task 418) is equal to 0. If the message flag is equal to 0, meaning that no conditions have arisen which require attention from the central processor, control is passed to task 412. Otherwise, task 423 composes a message requesting from the central processor assignment of additional radio spectrum. Then, task 424 sends this allocation request message to the central processor and increments the message flag. Task 425 clears the message flag after the base station receives updated allocation from the central processor. Then, task 426 updates the pilot data stream accordingly and control passes to task 412 to begin another cycle.

Figure 15:
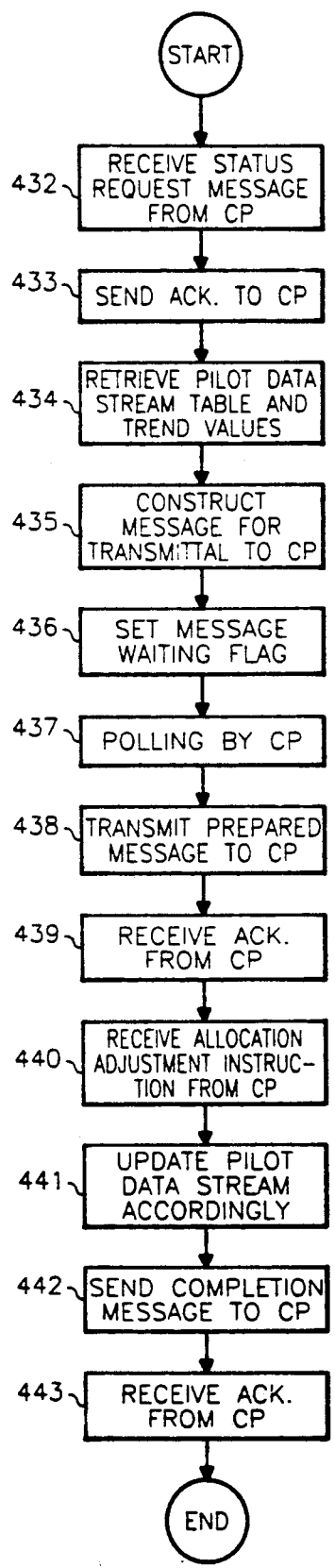
FIG. 15 is a flowchart of the status reporting and allocation releasing routines executed by a base station of the present invention.

Referring now to FIG. 15, the base station status reporting and allocation releasing routine will be described. This routine is performed whenever a call is received from central processor 52. When the central processor is preparing to shift allocation of voice channels from a base station with low traffic to another base station with high traffic and a corresponding need for additional voice base station allocation, the central processor will request a status report from the base station with low traffic and use this report in assisting that base station to release allocation of a block of voice channels.

The routine commences at task 432 which receives a message from the central processor (CP), requesting status of the base station. Task 433 sends to the central processor an acknowledgment of receipt of the status-request message. Then, task 434 retrieves the pilot data stream table of the base station as well as trend values from memory.

Task 435 then prepares this data for transmittal to the central processor. Task 436 sets a "message waiting" flag to indicate to the central processor, upon the next polling of the base station, that the requested data is ready for transmission. In task 437 the base station is polled by the central processor. Then task 438 transmits the prepared message to the central processor. Task 439 receives from the central processor an acknowledgment that the prepared message has been received.

Task 440 receives the allocation adjustment instruction from the central processor, and task 441 accordingly updates the pilot data stream to reflect the released voice channel allocation. Finally, task 442 sends a completion message to the central processor and task 443 receives from the central processor an acknowledgment thereto, ending the routine.

Figure 16:
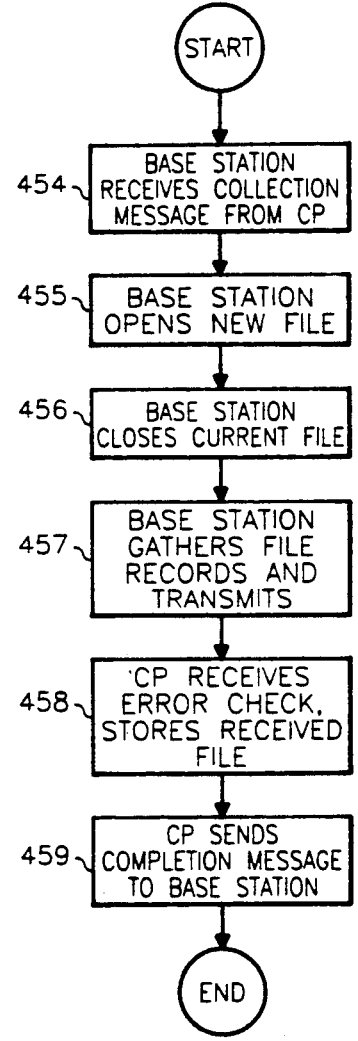
FIG. 16 is a flowchart of the call record collecting routine executed by a base station of the present invention.

Referring now to FIG. 16, the base station call record collecting routine will be described. This routine compiles and transmits up-to-date activity records of the base station in response to a request from the central processor.

The routine initiates with task 454 when the base station receives from the central processor an order to submit activity records to the central processor. This order may be received in lieu of the adjustment instruction discussed above in connection with task 440. In task 455 the base station opens a new activity record file to store the records of future calls which occur during this process of record collection. Then, task 456 closes the current activity record file. Task 457 gathers the various activity records and transmits them to the central processor. Task 458 indicates receipt at the central processor of these files, receipt of the error check associated thereto, and storage of the received file at the central processor. Finally, in task 459 the base station receives a message from the central processor indicating that the transfer of activity records has been completed, thereby ending the routine.

Figure 17:
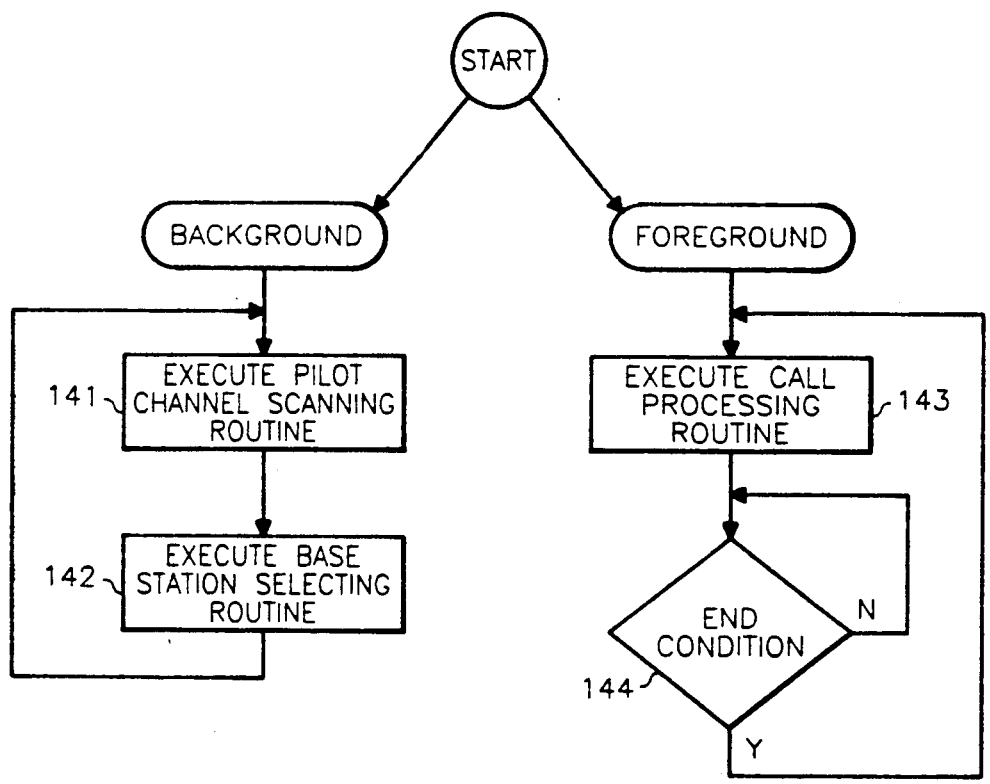
FIG. 17 is a flowchart of the general method of operation of an aircraft system of the present invention.

Referring now to FIG. 17, the overall operation of an aircraft system will be described. Each aircraft system, as described above, resides aboard an aircraft and continually evaluates the pilot signals within range in order to determine the optimal base station for that aircraft at its particular location. In addition, the aircraft system facilitates use of the on-board telephones, and transmits conversations to the base stations.

Task 141 executes a pilot channel scanning routine. This routine continually maintains and updates a list of the pilot signals that the aircraft system receives. This list is represented in the pilot data stream table. In this way, the aircraft system can choose an optimal base station at a particular time by accessing the pilot data stream table which lists all base stations within range. The pilot channel scanning routine operates continually in a background mode as long as the aircraft system receives power.

Next, task 142 executes the base station selecting routine. This routine periodically evaluates the pilot data stream table in order to determine which base station can currently offer the strongest signal for the longest duration, considering the relative altitude and geographical location of the aircraft system. The base station evaluation routine runs periodically, for example, every 3 minutes, thereby enabling the aircraft system to place calls at any time to the optimum base station.

In a foreground mode, task 143 executes the call processing routine. When a system user attempts to place a call, the call processing routine responds by prompting the user for information, initiating the link-establishing routine and attaching the user to the link. The link-establishing routine, initiated by the call processing routine, causes the aircraft system to establish communications with the base station deemed optimum by the base station selecting routine. After this link is successfully established, a pending call is connected to the link.

Query 144 determines whether or not an end of call condition has been received. If the answer to query 144 is negative, the program continues waiting for an end condition. However, once an end condition has been received, the program returns to task 143 where the call processing routine is re-initiated.

Figure 18:
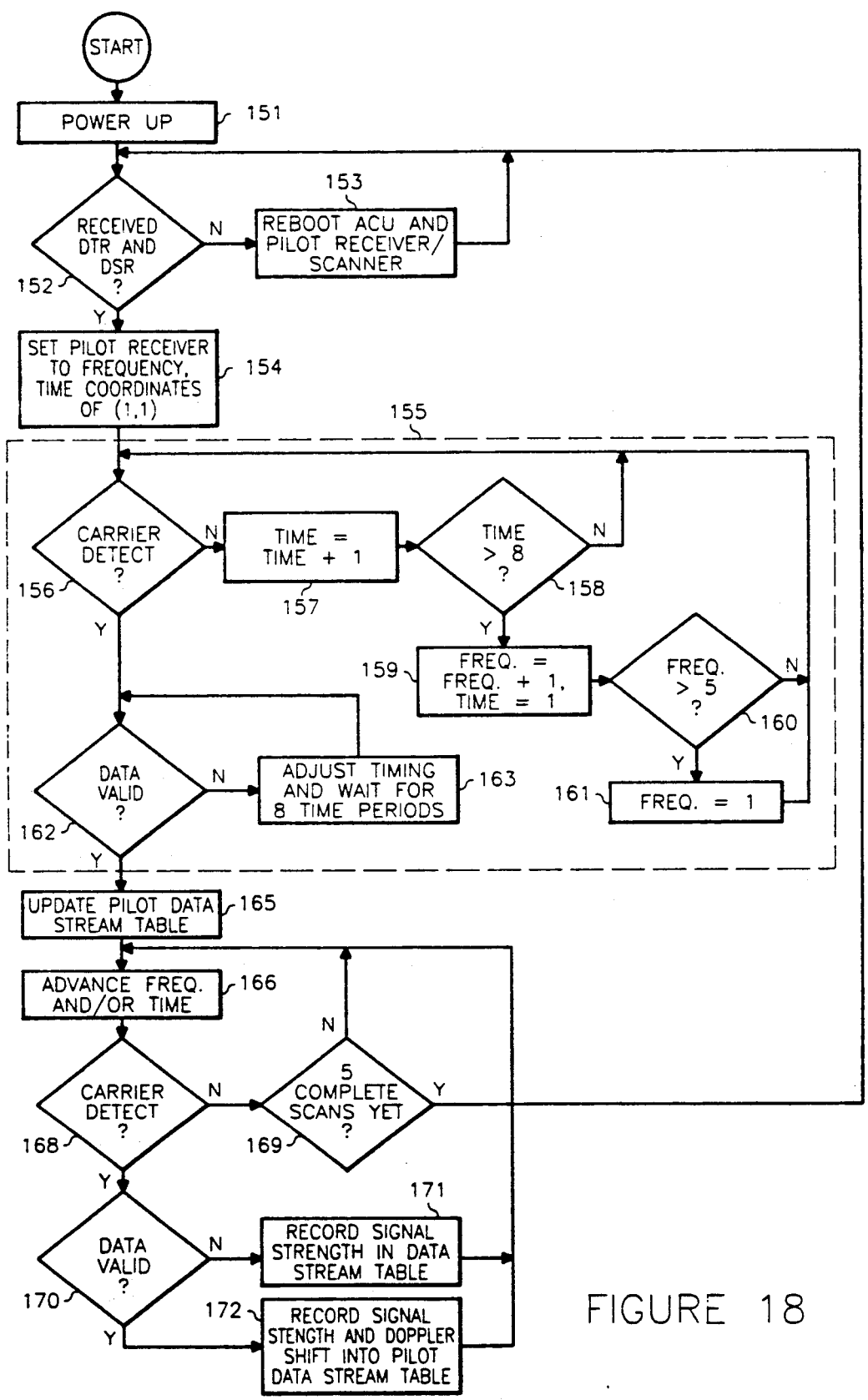
FIG. 18 is a flowchart of the pilot channel scanning routine executed by an aircraft system of the present invention.

Referring now to FIG. 18, the pilot channel scanning routine discussed above in connection with task 141 of FIG. 17, will be described. After the aircraft system receives power in task 151, the pilot channel scanning routine runs continuously. Query 152 determines whether or not the pilot receiver and aircraft processor 138 (see FIG. 4) have exchanged data terminal ready (DTR) and data service ready (DSR) messages via serial communications. In the event that such messages are not successfully exchanged, task 153 re-initiates operation of both the aircraft control unit (ACU) and pilot receiver, then returns control to query 152. If the data terminal ready and data service ready messages are properly exchanged, task 154 sets the pilot receiver to frequency and time coordinates or indexes of one and one, respectively.

Following task 154, routine 155 increments the frequency and time coordinates, thereby scanning through all possible pilot signals, until valid data is received. Thus, routine 155 effectively orients the aircraft system to the first-found pilot signal and synchronizes its time base to the time slot of this pilot signal.

Routine 155 will now be described in more detail. First, query 156 attempts to detect carrier signal at frequency and time coordinates of 1,1. If no carrier signal is detected, then task 157 increments time coordinates of the pilot receiver by one. As long as query 158 determines the time coordinate increment to be 8 or less, the number of time slots used by pilot signals in the preferred embodiment, the aircraft system continues returning to query 156 in successively higher increments of the time coordinate. Since, in the preferred embodiment of the present invention, the pilot signals are broadcast in 8 distinct time slots, query 156, task 157, and query 158 function to consecutively step through all the time coordinates at a particular frequency in search of a pilot signal.

However, if the time coordinate is found to be greater than 8 in query 158, task 159 re-sets the time coordinate to 1 and advances the frequency coordinate by 1. Then, query 160 determines whether or not the frequency coordinate is greater than 5. If the frequency coordinate is determined to be greater than 5, task 161 resets the frequency coordinate to 1. A frequency coordinate of 6 would be meaningless since there are only 5 different pilot frequencies broadcast by the base stations. With the new frequency coordinate, after being incremented in task 159 or reset in task 161, query 156 again attempts carrier detect. In the event carrier is detected in query 156, query 162 tests the data for validity. If the data is deemed invalid, task 163 adjusts its internal time base by a predetermined amount, then waits for 8 time periods before returning to query 162. By adjusting its internal time base, its internal synchronization is adjusted relative to future pulses of the pilot signal whose carrier was detected in task 156. Routine 155 continues in a loop consisting of tasks 162 and 163 until its internal time base closely matches the time slot of this pilot signal. At this point, task 162 will indicate the detection of valid data.

When query 162 determines the data to be valid, the routine advances to task 165. Task 165 updates the pilot data stream table with the frequency and time coordinate information of the detected pilot signal. For example, if the detected pilot signal is broadcast at a frequency coordinate of 1 and a time coordinate of 1, this information is then updated to the pilot data stream table. Now that the clock has been synchronized to a valid pilot signal, task 166 consecutively advances the frequency and/or time coordinates of the pilot receiver before query 168 attempts to detect carrier. If carrier is not detected, query 169 determines whether 5 complete scans have been made through the entire range of frequency and time coordinates. If the answer to query 169 is positive, control returns to task 152 to re-start the pilot channel scanning routine and refresh synchronization. Otherwise the frequency and time coordinates of the pilot receiver are advanced again starting at task 166. In this way, the frequency and time coordinates of the pilot receiver are advanced through every possible combination in order to determine which pilot signals are within range.

If query 168 detects a signal, query 170 determines whether or not the data is valid. If the data is invalid, task 171 measures the magnitude of the detected signal and records this information in the pilot data stream table. However, if the detected data is deemed valid by query 170, then task 172 measures the signal strength and Doppler frequency shift error of the detected signal and updates this information in the pilot data stream table. After tasks 171 or 172, control returns to task 166 in order to continue cycling through the coordinates of frequency and time, thereby searching for a carrier detect on all possible pilot signals.

In this way, then, the pilot channel scanning routine maintains a periodically updated record of the signal strength and Doppler frequency shift error for all pilot signals within range of a particular aircraft system.

Figure 19:
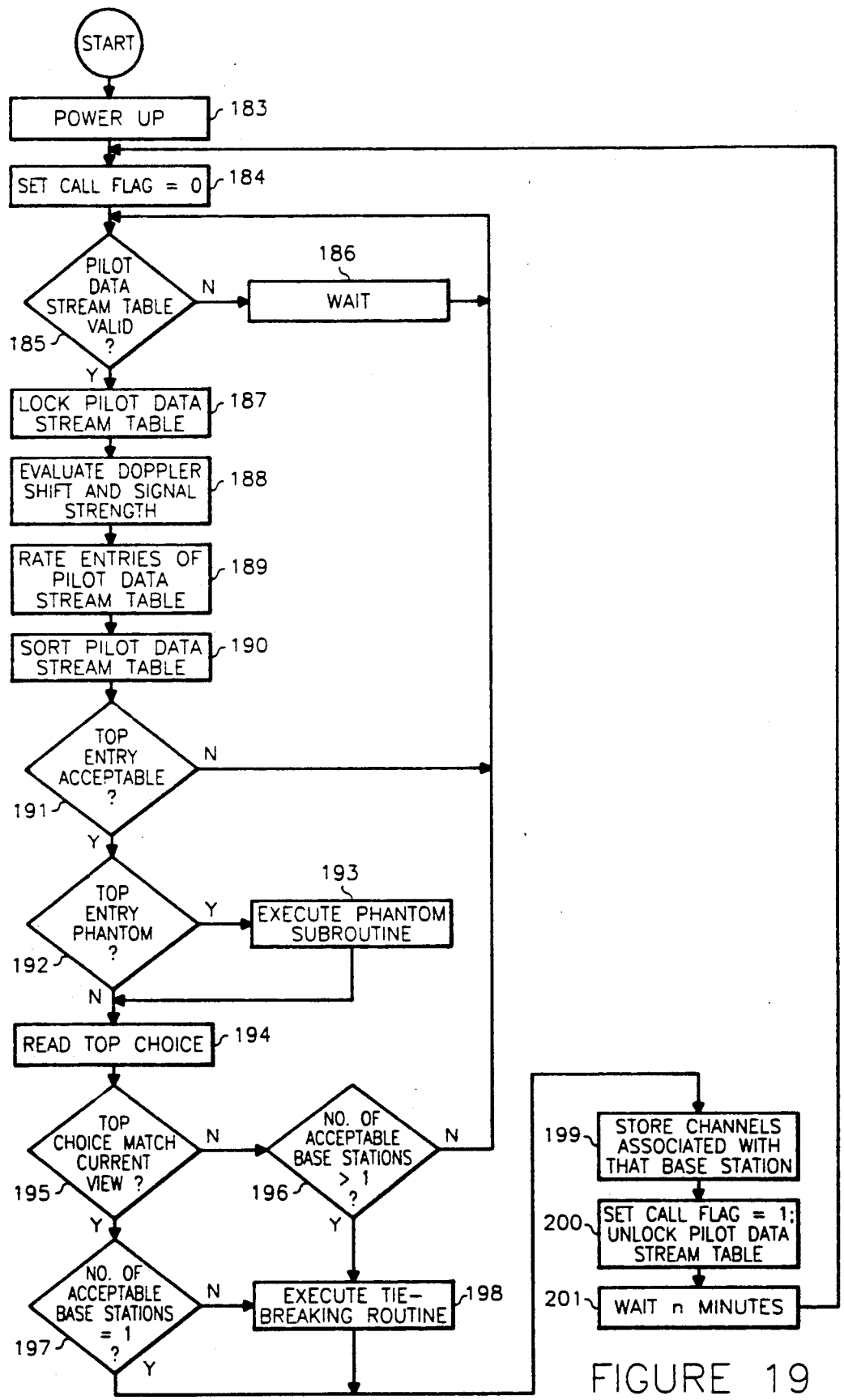
FIG. 19 is a flowchart of the base station selecting routine executed by an aircraft system of the present invention.

Referring now to FIG. 19, the base station selecting routine, discussed previously with task 142 and FIG. 17, will now be described. The base station selecting routine runs periodically, and serves to maintain and update a list, ranking the base stations within range. Since the base station selecting routine in the usual mode, runs on a continuous basis, it is only initiated in task 183 in the event the aircraft system receives power after a power loss. Subsequently, task 184 sets the call flag equal to 0, indicating that no calls are possible, since the base station selecting routine just started and no ratings have been attached to any base stations. Next, query 185 determines whether the pilot data stream table is valid. If not, task 186 waits for a predetermined period before returning to query 185 for another examination of the pilot data stream table. Task 186 permits the pilot channel scanning routine, which runs continuously, to place valid data in the pilot data stream table before it is again examined in query 185.

When the pilot data stream table is deemed valid by query 185, task 187 locks the pilot data stream table to prevent amendment or addition thereto. Then, task 188 evaluates the signal strength and Doppler frequency shift error of each detected pilot signal in the pilot data stream table. Task 189 attaches a rating to each pilot signal entry, where ratings 1 and 2 constitute acceptable base stations and ratings 3, 4, and U constitute unacceptable base stations. Such ratings are based upon pilot signal strength and Doppler shift, in a conventional manner. The actual values are determined by the receiving aircraft's altitude and direction of travel relative to each of the base stations within its radio horizon. This is explained in more detail in U.S. Pat. No. 4,419,766, entitled "Method and Means for Providing Improved Air/Ground Radio Telephone Communications." Base stations located at airports, which function only to communicate with aircraft on the ground, are given the U rating. Then, task 190 sorts the rated entries of the pilot data stream table, placing the best entry at the top of the list, the worst entry at the bottom of the list, and the intermediate entries on a continuum between top and bottom.

Query 191 determines whether or not the top-ranked pilot signal is acceptable (i.e. rated 1 or 2). If the highest-rated pilot signal does not bear a sufficient quality ranking, control returns to query 185. Otherwise, if the top ranked pilot signal is ranked above 3, query 192 asks whether or not this entry constitutes a phantom station. A phantom base station is one which is operating in restricted, learning mode. In this diagnostic mode, a base station broadcasts a specially coded pilot signal so that data concerning its operations can be collected before it is adopted into the network by the central processor. Such data include the frequency of aircraft contact, number of aircraft that would have selected the phantom station if operational, and the signal quality of the pilot signal as received by aircraft systems. If the top entry is determined by query 192 to be a phantom station, task 193 executes a phantom subroutine.

After either completion of task 193 or a negative answer to query 192, task 194 reads the pilot data stream information of the top-ranked pilot signal. Next, query 195 determines whether or not the aircraft's current radio horizon matches any of the recommendations, i.e. pilot groups discussed above, made by the pilot data stream of the top-ranked base station. If the current radio horizon does not match one of the pilot data stream pilot groups, query 196 determines whether or not the number of acceptable stations in the pilot data stream table exceeds 1. If the answer to query 196 is negative, meaning that there is only one acceptable base station and that base station is recommended for a radio horizon other than that which the aircraft currently has, control returns to query 185. Otherwise, if the number of acceptable base stations is greater than 1, task 198 executes a tie-breaking routine which selects from the best of the available pilot signals. When different base stations are roughly equivalent or acceptable, task 198 will select the base station which has the greatest fraction of total allocated channels available for use, as described by activity index 611 (see Table I).

If query 195 found a pilot group of the top-rated pilot station to match the pilot signals currently within range of the aircraft, query 197 determines whether or not the number of acceptable base stations is equal to 1. If the answer to query 197 is negative, task 198 executes tie-breaking routine 198. On the other hand, if the number of acceptable base stations is equal to one, task 199 stores the voice channels proffered by that base station's pilot data stream.

After task 199, task 200 sets the call flag equal to 1 indicate that calls are possible, since the pilot data stream table has been processed. Task 200 also unlocks the pilot data stream table, thereby allowing amendment or addition to the table. Next, task 201 waits a predetermined time before returning to task 184 to re-evaluate the pilot data stream table. This predetermined interval is that for which the pilot data stream table is computed to be valid for the radio horizon of the aircraft's usual speed in relation to the network of base stations.

Figure 20:
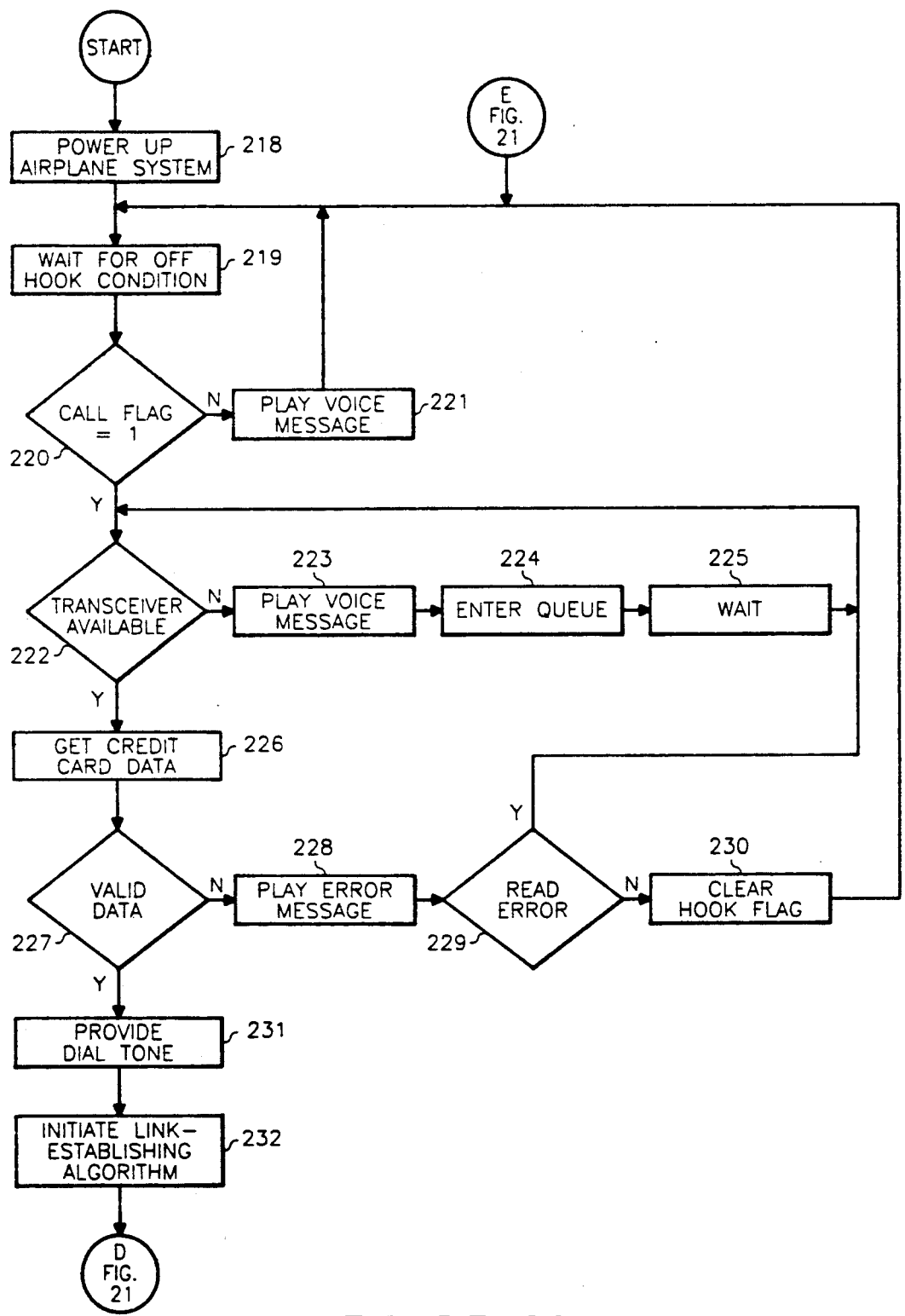
FIG. 20 is a flowchart of a first portion of a call processing routine executed by an aircraft system of the present invention.

Referring now to FIG. 20, the call processing routine of the aircraft system, as discussed above in task 143 of FIG. 17, will be described. In the absence of a power loss, the call processing routine runs continuously. It first waits for an "off hook" condition before prompting the user for information necessary to place a telephone call. It then appends an airborne user's call to a previously established aircraft system to base station link, then waits for a call-ending condition. Upon receipt of a call-ending condition it returns to wait for another off hook condition.

If power has been removed from the aircraft system, the call processing routine begins when the airplane system receives power in task 218. Task 219 waits for an "off hook" condition. Then, query 220 tests the call flag for a value equal to 1. The call flag, described above in FIG. 19, is set equal to 1 once the aircraft system has ranked the base stations within range and chosen the optimal station with which to communicate. Therefore, if query 220 determines that the call flag is not equal to 1, indicating that the base stations within range of the aircraft have not been ranked, task 221 returns a predetermined voice message to the user and then passes control to task 219. However, if the call flag is equal to 1, task 222 tests for availability of an aircraft transceiver. If no aircraft transceivers are available, task 223 plays a predetermined voice message for the user. Then, task 224 enters the call into a queue, task 225 waits for the next available aircraft transceiver, and query 222 again searches for an available aircraft transceiver.

On the other hand, when query 222 locates an available aircraft transceiver, task 226 obtains certain credit card information from the card submitted by the caller. Then, query 227 asks whether or not the data from the credit card is valid. To determine the validity of the credit card data, the program examines the expiration date of the card, whether the card is of a company accepted by the system, and whether the credit card number passes any other guidelines used in determining the validity of the credit card.

If query 227 has found the data of the credit card to be invalid, task 228 provides an error message for the caller. Then, query 229 determines whether or not the data was deemed invalid because of a read error. If so, the program returns to query 222 in order to search for an available aircraft transceiver. On the other hand, if the data was found to be invalid due to a reason other than a read error, task 230 clears the flag that was set to indicate an "off hook" condition, and returns to task 219 in order to wait for commencement of a new telephone call.

If query 227 found the data from the credit card to be valid, task 231 generates a dial tone for the user. Then, task 232 initiates the aircraft link-establishing routine in order to establish an air-to-ground link to which the pending call can be attached. After task 232, program control proceeds to task 233, shown in FIG. 21.

Figure 21:
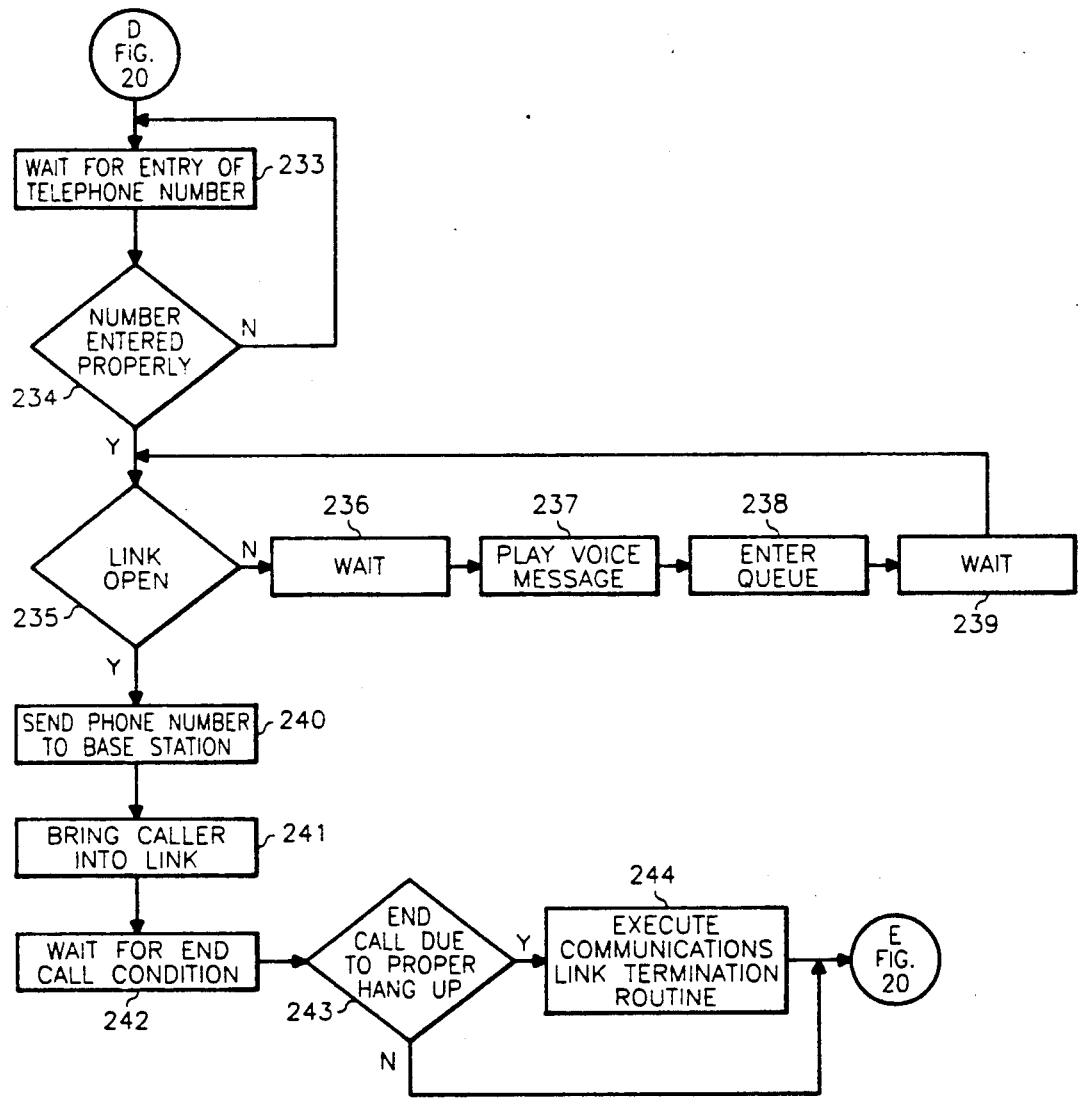
FIG. 21 is a flowchart of a second portion of the call processing routine executed by an aircraft system of the present invention.

With reference to FIG. 21, task 233 waits for the user to properly enter a telephone number. Task 234 determines whether or not the telephone number was correctly entered. If not, the program returns to task 233. On the other hand, when a correct number is properly entered, query 235 determines whether or not the link has been established by the aircraft link-establishing routine. If the link has not been established, task 236 waits for a predetermined time period, and task 237 plays a voice message for the user, task 238 then enters the call into a queue, and task 239 waits for another predetermined period of time before returning to query 235 to again check for an open link.

Once an open link has been found, task 240 transmits the telephone number dialed by the user to the selected base station. Then, task 241 appends the awaiting call to the existing link between the selected base station and the aircraft system. Following this, task 242 waits for an end call condition, such as "on hook" or a premature termination of the link, to proceed. Once an end call condition has occurred, query 243 determines whether or not the call ended due to proper hang up. If the call did not end due to a proper hang up, indicating that the link was broken unintentionally, the program returns to task 219 (see FIG. 20) to begin waiting for initiation of a new call. On the other hand, if the call ended due to a proper hang up, task 244 executes a routine that terminates the communications link between the aircraft system and the selected base station, and subsequently returns control to task 219 (see FIG. 20).

Figure 22:
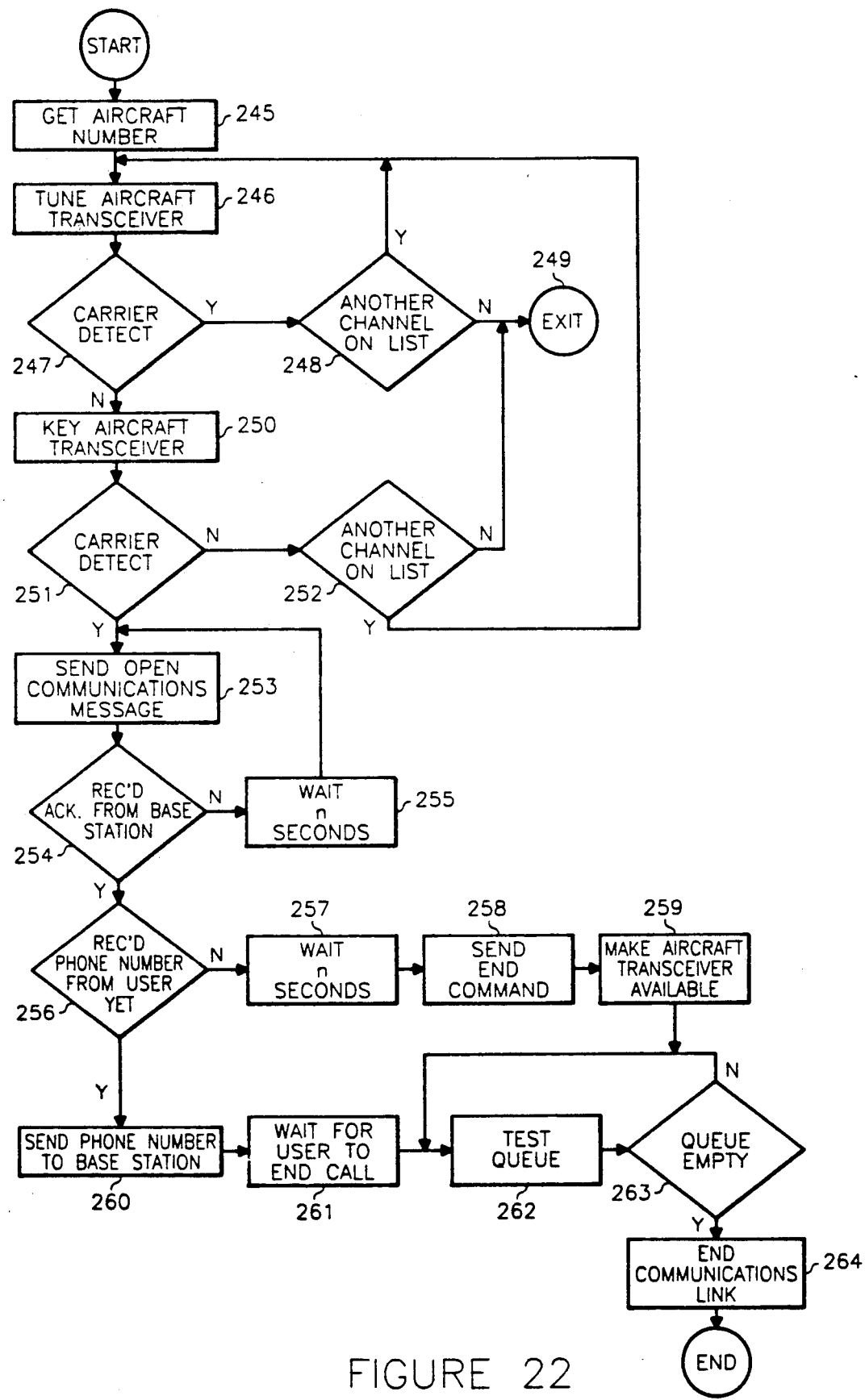
FIG. 22 is a flowchart of a link-establishing routine executed by an aircraft system of the present invention.

Referring now to FIG. 22, the link-establishing routine will be described. This routine establishes a communications link between an aircraft system and one of the base stations that was ranked in the base station selecting routine shown in FIG. 19.

After this routine is initiated by the call processing routine, described previously with FIG. 20, task 245 retrieves the frequency of a voice channel associated with the base station that has been selected by the base station selecting routine. Task 246 tunes an aircraft transceiver to the frequency of this voice channel. Then, query 247 determines whether or not a carrier signal is detected on this frequency. If the aircraft transceiver detects carrier signal on this voice channel, indicating it is already in use, query 248 determines whether or not there are other available voice channels associated with the selected base station. If not, task 249 aborts the link-establishing routine. If other channels are available, the program returns to task 246 to tune an available aircraft transceiver to one of these available voice channels.

However, if query 247 was unsuccessful in detecting carrier, indicating the vacancy of the selected voice channel, task 250 keys the aircraft transceiver in order to initiate communications with the selected base station. Then, query 251 determines whether or not carrier is detected on the selected voice channel. If none is found, query 252 determines whether or not there are other available voice channels on the list associated with the selected base station. If no other channels are listed, task 249 aborts the link-establishing routine and exits. Otherwise, task 246 tunes an available aircraft transceiver to one of the available voice channels.

However, if query 251 indicates carrier detect, a base station has apparently responded to the keying of the aircraft transceiver in task 250. In response, task 253 sends to the selected base station a command to open communications. Such a message includes, among other things, the airplane's identification number, a portion of the pilot data stream table, and the user's credit card number. Then, query 254 determines whether or not an acknowledgment was received from the selected base station. If not, task 255 waits for a predetermined amount of time before returning to task 253 to re-send the command to open communications.

Once the acknowledgment is received from the base station, query 256 determines whether or not the user has dialed a telephone number. If the user has not dialed a telephone number, task 257 waits for a predetermined amount of time before task 258 orders the base station to end attempts at conducting the current call. Then, task 259 frees the aircraft transceiver, and task 262 examines the contents of the queue. The queue maintains a list of all currently pending calls aboard the aircraft, so that once a communications link between the aircraft system and a base station has been established, these pending calls can be attached to the open link. This link is kept open as long as there are any pending or active calls for that particular base station.

If query 256 receives the phone number dialed by the user, task 260 sends the telephone number to the selected base station. Then, task 261 waits for the user to end his call. Next, task 262 tests the queue for any pending call requests. Once query 263 determines that no call requests are pending in the queue, task 264 ends the communication link, and the program stops. But, as long as task 262 and query 263 find the queue to be unempty, the communications link in maintained.

An alternate embodiment of the invention is possible, comprising a simplified frequency reassignment technique that can be used with the currently deployed air-to-ground system described in the prior art. The currently deployed system utilizes 31 voice channels and 10 pilot frequencies. Thus, the available spectrum is divided into 10 groups of 31 channels. An aircraft selects the best pilot channel in terms of call quality and duration, and then chooses one of the available voice frequency channels associated with that pilot channel for its exclusive use. The pilot frequencies are geographically separated so that voice channel interference is prevented.

The alternate embodiment improves upon that technique by also making available to a given aircraft any other pilot channels which can be used without interference. Accordingly, during the process of selecting an optimum pilot channel, the aircraft scans all 10 pilot frequencies. This information is contained in a list of pilots and associated channels within the radial horizon of the aircraft. Any pilot channel within range, other than the optimal pilot channel, is proscribed from use by the aircraft computer to prevent interference. Any pilot signal not present in the aircraft list is out of range and therefore non-interfering. Each ground station is equipped with additional transceivers that are tuned to frequencies not associated with the assigned pilot frequency.

As an example, two frequencies from each of the other nine groups are assigned to a ground station. This gives 18 additional channels to the ground station. The identification codes for these transceivers are incorporated into the resident pilot data stream and broadcast to all in-range aircraft. The channel identification code is such that it identifies the pilot group it is normally associated with.

The aircraft finding all of the optimal stations' normal channels in use will select from the data stream one of the additional channels installed at the station. The aircraft will only select an additional channel if that channel's group pilot is not currently within its radio horizon.

The assignment of additional channels is static and performed as part of normal traffic analysis. This is a simplified method of improving spectrum reuse over the current method but falling short of the capabilities of the preferred embodiment.

The primary advantages of the alternative system are its low development cost and its ability to perform in context of the currently deployed radial system. It also enables selective deployment since it is transparent to current operations.

It should be apparent that the preferred embodiment and the alternate embodiment described herein provide a number of advantages with respect to air-to-ground communication that have heretofore not been available. The ability to manage a system to provide efficient allocation of voice channels in various geographic regions is highly significant with regard to meeting the needs of higher traffic demands expected in future systems.

I claim:

1. A method of operating one of a plurality of mobile radio units in a system for conducting communications between said plurality of mobile radio units and a plurality of base stations, said method operating to conserve frequency spectrum available for said communications, and said method comprising the steps of:
   detecting a first signal which occurs periodically within a pilot frequency channel;
   identifying a first one of a predetermined number of time slots within which said first signal periodically occurs;
   detecting a second signal which occurs periodically within said pilot frequency channel;
   identifying a second one of said predetermined number of time slots within which said second signal periodically occurs, said first and second time slots differing from one another;
   obtaining, from said first and second signals, data descriptive of voice frequency channels available for use by said one radio unit; and
   establishing a voice communication link over one of said voice frequency channels.

2. A method as claimed in claim 1 wherein each of said first and second signals is encoded to communicate synchronization data, and said method additionally comprises the step of synchronizing operation of said one mobile radio unit to one of said predetermined number of time slots.

3. A method as claimed in claim 1 additionally comprising the steps of:
   monitoring signal strength and doppler shift of said first and second signals; and
   comparing said signal strengths and doppler shifts of said first and second signals to select only one of said first and second signals as a pilot for upcoming communications.

4. A method as claimed in claim 3 wherein said first and second signals originate from first and second ones, respectively, of said base stations and are encoded to communicate first and second data, respectively, describing fractions of total numbers of frequency channels allocated to said first and second base stations, respectively, and said method additionally comprises the step of comparing said first and second data to select said one of said first and second signals as a pilot for upcoming communications.

5. A method as claimed in claim 4 additionally comprising the step of selecting, when said monitored signal strength and doppler shift of said first and second signals are roughly equivalent, said one of said first and second signals which is indicated by said first and second data to have the greatest fractional availability of allocated frequency channels.

6. A method as claimed in claim 1 additionally comprising the step of tuning a transceiver portion of said one mobile radio unit to said one of said voice frequency channels.

7. A method as claimed in claim 1 wherein said establishing step comprises the steps of:
   monitoring said one voice frequency channel for existing communication activity; and
   keying a transmitter portion of said transceiver so long as said monitoring step fails to detect said existing communication activity.

8. A method of operating one of a plurality of mobile radio units in a system for conducting communications between said plurality of mobile radio units and a plurality of base stations, said method operating to conserve frequency spectrum available for said communications, and said method comprising the steps of:
   receiving first and second pilot signals transmitted from first and second ones, respectively, of said base stations;
   obtaining, from said first and second pilot signals, data descriptive of communication channels associated with said first and second base stations, respectively, and currently idle so that said channels may be used by said one radio unit;
   obtaining, from said first and second pilot signals, first and second data, respectively, describing fractions of total numbers of frequency channels available for use at said first and second base stations, respectively;
   selecting one of said first and second base stations with which to establish communication, said selecting being based upon said first and second pilot signals and upon a comparison of said first and second data; and
   adjusting a transceiver within said one mobile radio unit to operate within one of said communication channels associated with said selected one of said first and second base stations and described by said data.

9. A method as claimed in claim 8 wherein said selecting step comprises the steps of:
   monitoring signal strength and doppler shift of said first and second pilot signals; and
   comparing said signal strengths and doppler shifts of said first and second pilot signals.

10. A method as claimed in claim 9 wherein said selecting step additionally comprises the step of choosing, when said monitored signal strength and doppler shift of said first and second pilot signals are roughly equivalent, said one of said first and second base stations which is indicated by said first and second data to have the greatest fractional availability of idle frequency channels.

11. A method as claimed in claim 8 additionally comprising the step of establishing a communication link through said one communication channel with said selected one of said base stations.

12. A method as claimed in claim 11 wherein said establishing step comprises the steps of:
 monitoring said one communication channel for existing communication activity; and
 keying a transmitter portion of said transceiver if said monitoring step fails to detect said existing communication activity.

13. A method for efficiently utilizing a predetermined number of frequency channels to simultaneously conduct communications between a plurality of mobile radio units and a plurality of spaced apart base radio units, said method comprising the steps of:
 transmitting, from a first one of said base radio units, a first pilot signal configured to communicate data descriptive of a first group of said frequency channels through which said first base radio unit can communicate with one of said mobile radio units;
 transmitting, from a second one of said base radio units, a second pilot signal configured to communicate data descriptive of a second group of said frequency channels through which said second base radio unit can communicate with one of said mobile radio units;
 dynamically allocating a first portion of said predetermined number of frequency channels to said first base radio unit and a second portion of said predetermined number of frequency channels to said second base radio unit; and
 monitoring, at said first one of said base radio units, a fraction of said first portion of said predetermined number of frequency channels being used to conduct communications; and
 requesting allocation of additional ones of said predetermined number of frequency channels to said first one of said base radio units in response to said monitored fraction.

14. A method as claimed in claim 13 additionally comprising the steps of:
 monitoring, at said second one of said base radio units, a fraction of said second portion of said predetermined number of frequency channels being used to conduct communications;
 configuring said first pilot signal to communicate data descriptive of said fraction of said first portion; and
 configuring said second pilot signal to communicate data descriptive of said fraction of said second portion.

15. A method of operating one of a plurality of mobile radio units in a system for conducting communications between said plurality of mobile radio units and a plurality of base stations, said method operating to conserve frequency spectrum available for said communications, and said method comprising the steps of:
 receiving pilot signals broadcast from ones of said plurality of base stations which are within range of said mobile unit;
 analyzing said received pilot signals to identify said ones of said plurality of base stations which are within range of said mobile unit, said identified base stations together defining a radio horizon;
 selecting one of said base stations with which to conduct communications;
 analyzing said received pilot signal from said selected one of said base stations to identify a frequency channel available for use within said radio horizon; and
 tuning a transceiver portion of said one mobile radio unit to said frequency channel.

16. A method as claimed in claim 15 additionally comprising the step of analyzing said received pilot signal from said selected one of said base stations to detect data descriptive of said radio horizon.

17. A method as claimed in claim 16 wherein said identified frequency channel is associated with said data descriptive of said radio horizon in said pilot signal.

18. A system for efficiently utilizing a predetermined number of frequency channels to simultaneously conduct communications between a plurality of airborne mobile radio units and a plurality of spaced apart base radio units, said system comprising:
 means, coupled to one of said base radio units, for transmitting a pilot signal from said one of said base radio units, said pilot signal being configured to communicate data descriptive of a first radio horizon which includes said one base radio unit and data descriptive of a second radio horizon which includes said one base radio unit;
 means, coupled to said one base radio unit, for dynamically allocating a first portion of said predetermined number of frequency channels to said first radio horizon and a second portion of said predetermined number of frequency channels to said second radio horizon.

19. A system as claimed in claim 18 wherein said transmitting means is configured so that:
 said pilot signal communicates data descriptive of a first portion of said channels in connection with said first radio horizon; and
 said pilot signal communicates data descriptive of a second portion of said channels in connection with said second radio horizon.

20. A system as claimed in claim 18 additionally comprising:
 second means, coupled to a second one of said base radio units, for transmitting a second pilot signal from said second one of said base radio units, said second pilot signal being configured to communicate data descriptive of a third radio horizon which includes said second base radio unit and said first base radio unit.

21. A system as claimed in claim 18 wherein said data descriptive of said first radio horizon includes data identifying a first set of said base radio units, and said data descriptive of said second radio horizon includes data identifying a second set of said base radio units.

* * * * *

UNITED STATES PATENT AND TRADEMARK OFFICE
CERTIFICATE OF CORRECTION

PATENT NO. : 5,123,112

DATED : June 16, 1992

INVENTOR(S) : Bernard K. Choate

It is certified that error appears in the above-identified patent and that said Letters Patent is hereby corrected as shown below:

In Column 17, line 35, delete "ground" and insert --aircraft--.

In Column 17, line 36, delete "group" and insert --ground--.

Signed and Sealed this

Third Day of August, 1993

Attest:

MICHAEL K. KIRK

*Attesting Officer*     *Acting Commissioner of Patents and Trademarks*